(12) United States Patent
Suzuki et al.

(10) Patent No.: US 6,493,158 B2
(45) Date of Patent: Dec. 10, 2002

(54) LENS DRIVING APPARATUS FOR OPTICAL DISC PLAYER AND PRINTED CIRCUIT BOARD COILS FOR LENS DRIVING APPARATUS FOR DISC PLAYER

(75) Inventors: Jun Suzuki, Tokorozawa (JP); Katsumi Ishii, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/768,004

(22) Filed: Jan. 24, 2001

(65) Prior Publication Data

US 2001/0026403 A1 Oct. 4, 2001

(30) Foreign Application Priority Data

Feb. 9, 2000 (JP) ........................................ 2000-032508

(51) Int. Cl.[7] ................................................. G02B 7/02
(52) U.S. Cl. ........................................ 359/824; 359/814
(58) Field of Search .................................... 359/824, 814, 359/813; 369/44.14, 44.15, 44.19

(56) References Cited

U.S. PATENT DOCUMENTS

| | | | | | |
|---|---|---|---|---|---|
| 5,165,088 A | * | 11/1992 | Suzuki et al. | ................ | 359/813 |
| 5,177,640 A | * | 1/1993 | Grassens | .................... | 359/814 |
| 5,359,459 A | * | 10/1994 | Kim | ........................... | 359/824 |
| 6,278,665 B1 | * | 8/2001 | Schell et al. | .................. | 369/13 |

\* cited by examiner

Primary Examiner—Georgia Epps
Assistant Examiner—Omar Z. Hindi
(74) Attorney, Agent, or Firm—Morgan, Lewis & Bockius LLP

(57) ABSTRACT

A lens driving apparatus of a disc player which can avoid the rolling of a movable portion without increasing a weight of a movable portion of an actuator and printed circuit board coils for the lens driving apparatus are provided. A center of gravity of a focusing coil is located on a lower side in the focusing direction than a plane including a distribution center line of a drive force which is generated from a pair of tracking coils.

12 Claims, 20 Drawing Sheets

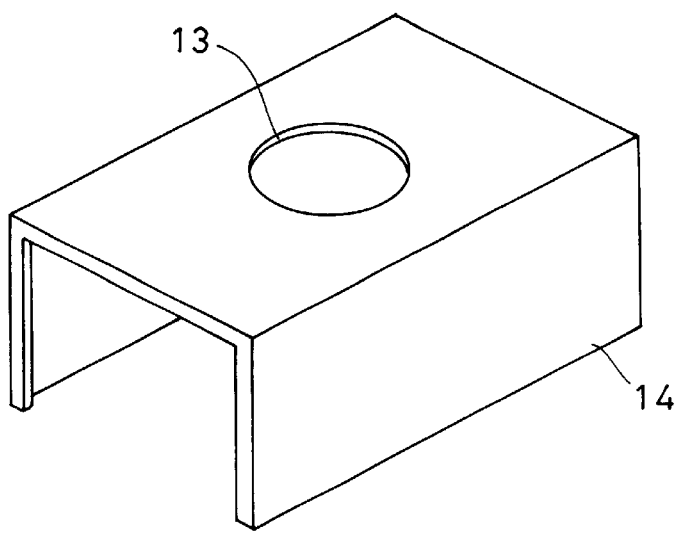
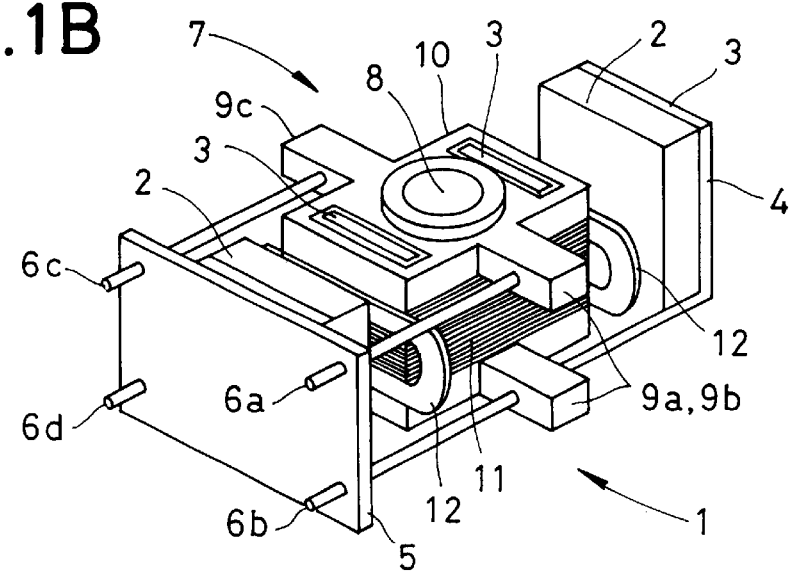
FIG.1A
FIG.1B
FIG.1C

LENS DRIVING APPARATUS FOR OPTICAL DISC PLAYER AND PRINTED CIRCUIT BOARD COILS FOR LENS DRIVING APPARATUS FOR DISC PLAYER

BACKGROUND OF THE INVENTION

1. Field of the Invention

The present invention relates to a lens driving apparatus for a disc player for optically writing or reading information to/from a disk-shaped recording medium such as a compact disc, optical disc, or the like.

2. Description of the Related Art

As shown in FIGS. 1A to 1C, hitherto, a pickup apparatus 1 for reproducing information recorded on an optical disc such as CD, DVD, or the like is known. In the pickup apparatus 1, in order to accurately read the information recorded on the optical disc, a focusing control for controlling a distance between the information recording surface of the optical disc and an objective lens is performed for a warp or oscillation of the optical disc and a tracking control for performing a tracking control of the objective lens so as to cope with an eccentricity of an information track on the optical disc is performed.

The pickup apparatus 1 comprises: a plate-shaped actuator base 4 on which a yoke 3 to which a pair of magnets 2 are fixed is arranged so as to face the actuator base 4; a movable portion 7 movably supported or connected by four supporting wires or connectors 6a to 6d to a supporting base 5 that is fixed with screws or the like (not shown) to the side surface of the actuator base 4; an actuator cover 14 in which an opening hole 13 for an objective lens 8 is formed in a top portion for protecting the movable portion 7 and which is formed in a box shape by a metal plate or resin; and a pickup body (not shown) for enclosing optical parts such as a light source, collimator lens, beam splitter, and the like.

The objective lens 8 is provided for the movable portion 7. The movable portion 7 includes: a lens holder 10 having four fixing arms 9 projecting in the tracking direction and having, for example, an almost rectangular parallelepiped shape. A focusing coil 11 wound around a body of the lens holder 10. Four D-shaped tracking coils 12 are fixed to both side surfaces of the lens holder 10 which faces the magnets 2. The four fixing arms 9 of the lens holder 10 are provided for the supporting base 5 and fixed to the four supporting wires 6a to 6d, so that the movable portion 7 is movably supported to the actuator base 4.

The four supporting wires 6a to 6d are used for movably supporting the movable portion 7 and used as connecting wires for supplying drive current to the focusing coil 11 and four tracking coils 12. For this purpose, these wires or connectors are made of an elastic member having high conductivity.

One end portion of the focusing coil 11 wound around the body of the lens holder 10 is connected to, for example, the supporting wire 6a and the other end portion is connected to the supporting wire 6b. By supplying the focusing drive currents to the two supporting wires 6a and 6b of the supporting base 5, therefore, the movable portion 7 is driven in the focusing direction.

The four tracking coils 12 fixed to both side surfaces of the lens holder 10 are serially connected by using the two supporting wires 6c and 6d and conductive wires (not shown). That is, one supporting wire 6c is connected to one end portion of each of the two tracking coils 12 which are fixed to one side surface of the lens holder 10 and serially connected. The other supporting wire 6d is connected to one end portion of each of the two tracking coils 12 which are fixed to the other side surface of the lens holder 10 and serially connected. By connecting the other end portions of the tracking coils 12 by the conductive wires, the four tracking coils 12 are serially connected to the two supporting wires 6c and 6d. Therefore, the movable portion 7 is driven in the tracking direction by supplying tracking drive currents to the two supporting wires 6c and 6d.

The center of gravity of the lens holder 10 constructing the movable portion 7 is located almost at the center of the lens holder 10 even in a state where the focusing coil 11 is wound around the body as shown in FIG. 2A. When the objective lens 8 is built in the lens holder 10, its center of gravity is shifted to a position shown at Gn in the diagram near the top surface of the lens holder 10. The center of gravity of the tracking coils 12 fixed to both side surfaces of the lens holder 10 is located at a center position shown at Gt in the diagram of an operating line DL connecting the centers of the two tracking coils as shown in FIG. 2B. The center of gravity of the movable portion 7 in the case where the tracking coils 12 are fixed to side surfaces of the lens holder 10 is located at a position shown at Gp in FIG. 2C, namely, it is located at an upper position than the operating point of the tracking coils 12.

Although the tracking coils 12 generate a drive force around the operating point as a center, in the case where the center of gravity of the movable portion 7 is located at a position above the operating point, the movable portion 7 generates an angular moment shown at M in the diagram. In order to make the center of gravity of the movable portion 7 coincide with the operating point, hitherto, a counterweight 15 as shown in FIG. 2D is attached to the lens holder 10. That is, the generation of the angular moment is prevented by lowering the position of the center of gravity of the movable portion 7 to the position of the operating point due to a weight of the counterweight 15.

Although the counterweight 15 has an effect of suppressing the angular moment as mentioned above, there is a problem that since the total weight of the movable portion 7 is increased by the weight of the counterweight, sensitivity of the actuator is deteriorated.

OBJECTS AND SUMMARY OF THE INVENTION

The invention has been developed to solve the foregoing problems and it is an object of the invention to provide a lens driving apparatus for a disc player, in which the generation of an angular moment can be suppressed without using a counterweight and to provide printed circuit board coils for the lens driving apparatus for the disc player.

To accomplish the above object, according to a first aspect of the invention, there is provided a lens driving apparatus for a disc player having magnetic flux applying means for movably supporting a lens holder on which an objective lens, a focusing coil, and tracking coils are fixed and for applying a magnetic flux to the focusing coil and the tracking coils, wherein the focusing coil is fixed so that its center of gravity is located on the opposite side of the objective lens in the focusing direction with respect to an operating line of a tracking drive force which is generated from the tracking coils.

According to a second aspect of the lens driving apparatus for a disc player of the invention, the focusing coil and tracking coils are printed circuit board coils formed by printing coils onto a single circuit board, and the center of gravity of the printed circuit board coils is located on the opposite side of the objective lens in the focusing direction with respect to the operating line of the tracking drive force.

According to another aspect of the lens driving apparatus for a disc player of the invention, the apparatus has printed circuit board coils which are fixed to a lens holder so that parts of the coils are projected from a lower edge of the lens holder in the direction away from the objective lens in the focusing direction.

According to a further aspect of the lens driving apparatus for a disc player of the invention, the apparatus has printed circuit board coils which are formed by printing a pair of tracking coils arranged in the tracking direction on the circuit board and a focusing coil located at a position further away from the objective lens in the focusing direction than the tracking coils, and an area between the pair of tracking coils on the circuit board has a notched portion.

According to yet another aspect of the invention, there are provided printed circuit board coils for a lens driving apparatus for a disc player, in which the coils are fixed to a lens holder and at least a single focusing coil and tracking coils are printed on a circuit board, wherein the pair of tracking coils are arranged in the tracking direction and printed, the focusing coil is printed so that its center axis is located at a position different from that on a straight line connecting center axes of the pair of tracking coils, an area between the tracking coils on the circuit board having a notched portion, and the position of the center of gravity as a whole differs from that on the straight line.

BRIEF DESCRIPTION OF THE DRAWINGS

FIGS. 1A to 1C are exploded perspective views of a conventional pickup apparatus;

DETAILED DESCRIPTION OF THE PREFERRED EMBODIMENTS

Figure 2A:
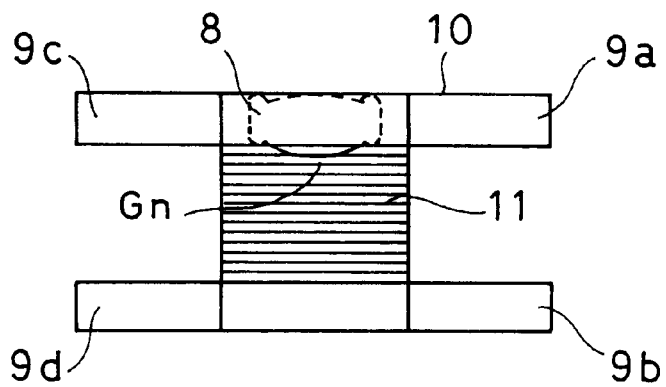
FIGS. 2A to 2D are exploded side elevational views of the conventional pickup apparatus.
Figure 2B:
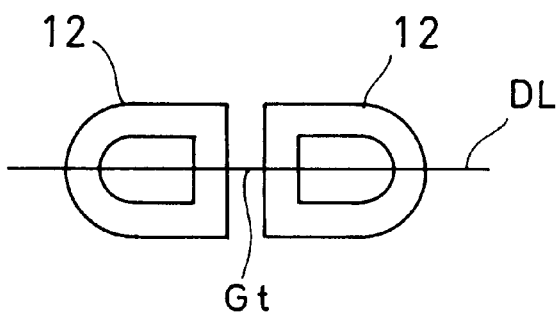
Figure 2C:
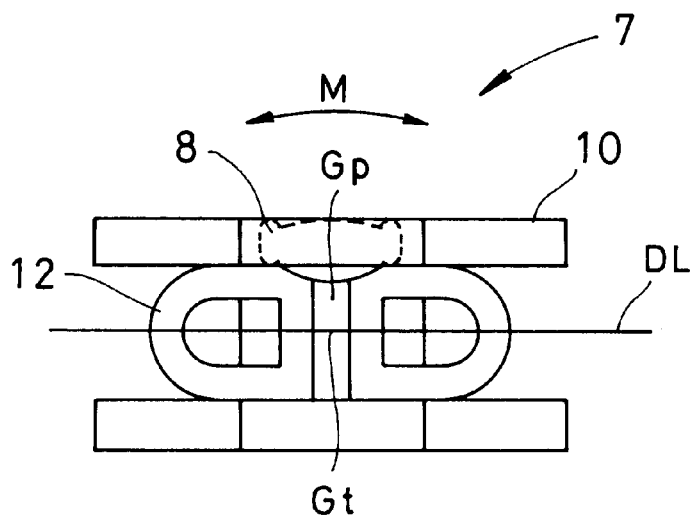
Figure 2D:
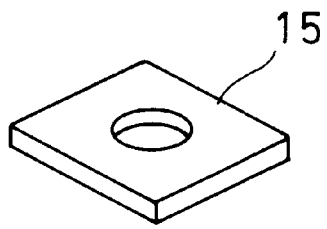
Figure 3:
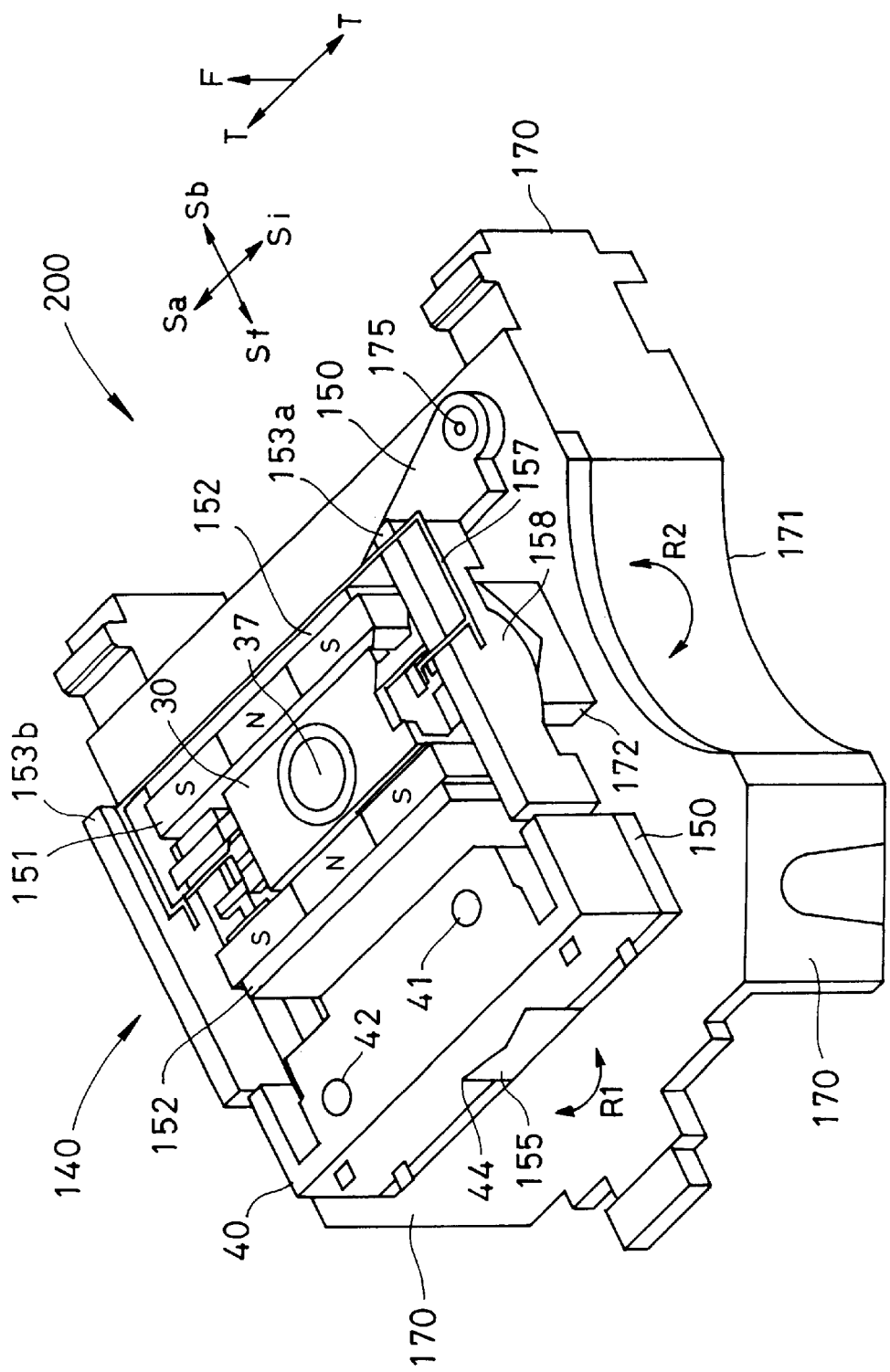
FIG. 3 is a perspective view of a pickup apparatus of an embodiment of the invention.
Figure 4:
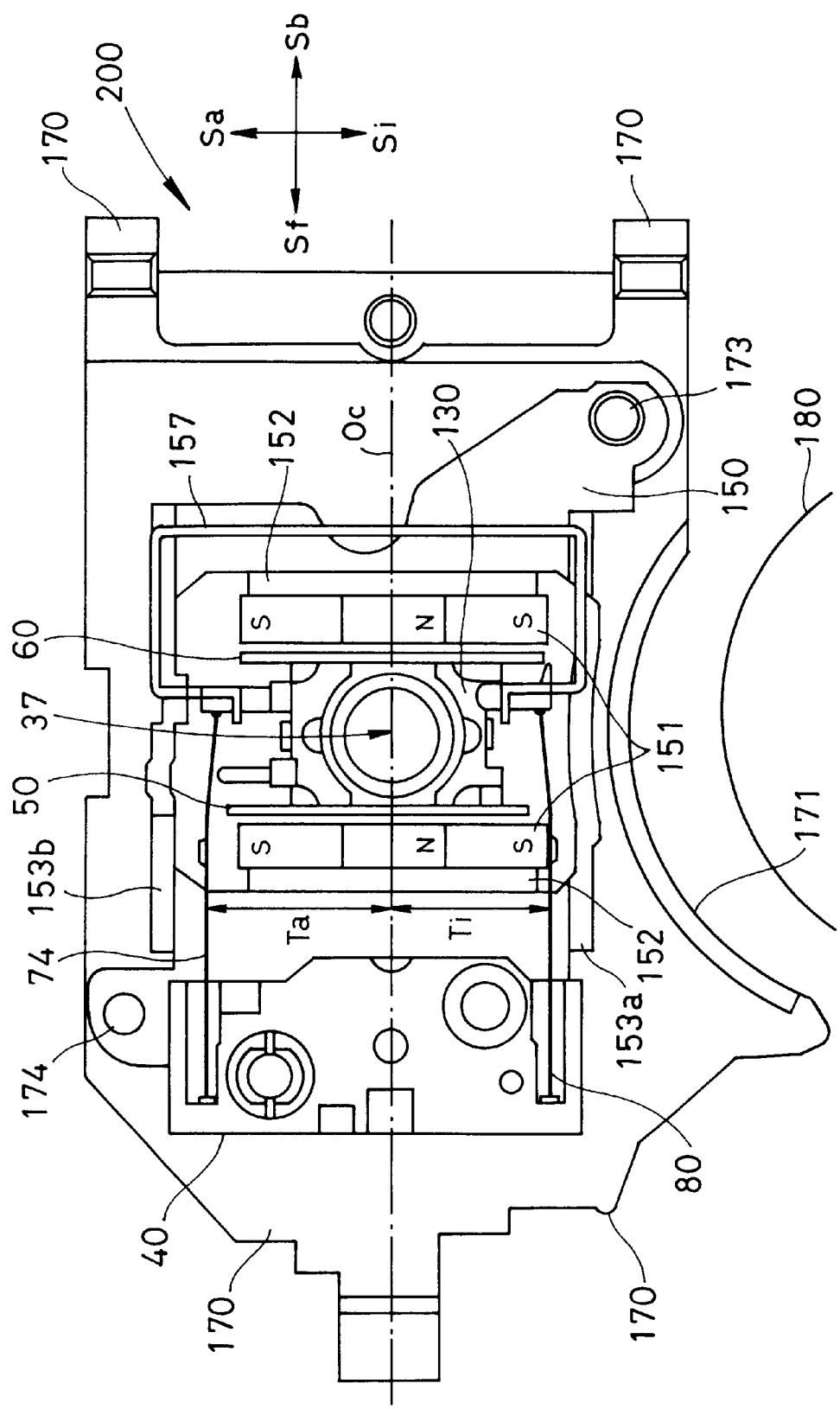
FIG. 4 is a plan view of the pickup apparatus of the embodiment of the invention.
Figure 5:
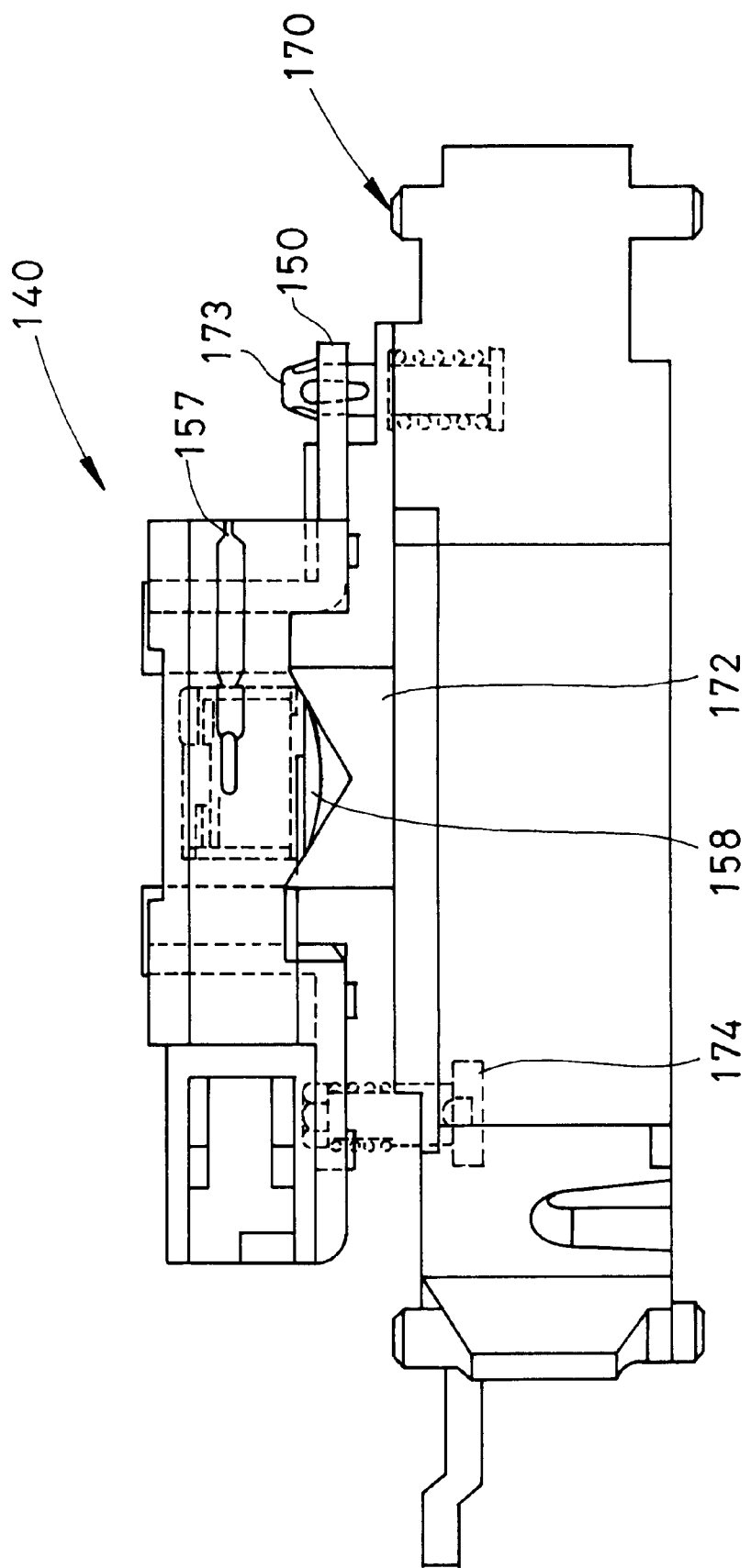
FIG. 5 is a side elevational view on the inner peripheral side of the pickup apparatus of the embodiment of the invention.

FIG. 3 is a perspective view of a main portion of a pickup apparatus 200 as an embodiment of the invention. FIG. 4 is plan views of the pickup apparatus 200. FIG. 5 is a side elevational view of the pickup apparatus 200 when it is seen from a spindle motor 180 side. A construction of the pickup apparatus 200 will now be described hereinbelow with reference to FIGS. 3 to 5.

The pickup apparatus 200 of the invention includes a lens holder 30 having an objective lens 37 therein. A movable portion 130 comprises: the lens holder 30; and printed circuit board A coil 50 and printed circuit board B coil 60 which are respectively fixed to the side surfaces of the lens holder 30. An actuator portion 140 is provided for supporting the movable portion 130 to a suspention base 40 by four linear elastic members 74, 94, 80, and 104 and movably supporting the movable portion 130. A pair of yokes 152 are provided to which a pair of multipole magnetized magnets 151 are fixed. The magnets 151 are constructed by an I-shaped N pole face and a U-shaped S pole face which are arranged so as to face each other and to sandwich the movable portion 130. An actuator base 150 includes a pair of standing portions 153a and 153b which are arranged so as to face each other and to surround the side surfaces in the tracking direction (shown by an arrow T in the diagram) of the movable portion 130. A pickup body 170 is made of diecast aluminum or the like for enclosing optical parts such as the light source, collimator lens, beam splitter, and the like (not shown). The pickup body has a semicircular concave 171 formed on the side surface close to the spindle motor 180. In the diagram, arrows Si and So indicate an inner peripheral direction and an outer peripheral direction of an optical disc (not shown) which is rotated by the spindle motor 180, respectively.

The actuator portion 140 is fixed to an actuator base 150 by a screw with a spring (not shown) and a fixing screw (not shown) which are inserted into two attaching holes 41 and 42 of a suspension base 40. The actuator portion 140 is fixed by a projecting groove 44 having a V-shaped bottom surface formed in a bottom surface of the suspension base 40 and projecting plates 155 each having an M-shaped concave apex surface formed on the actuator base 150 in such a manner that a position in the direction shown by an arrow R1 in the diagram of FIG. 3 has been adjusted. The actuator position 140 is brought into engagement with a pillar 173 with a spring fixed to the pickup body 170 via a through hole formed in one end of the actuator portion. The other end of the actuator portion is fixed to the pickup body 170 by a fixing screw 174. The actuator base 150 is fixed to the pickup body 170 by projecting portions 158 formed on the left and right standing portions 153a and 153b and by an M-shaped holding portion 172 of the pickup body 170 in such an arrangement that a position in the direction shown by an arrow R2 in the diagram has been adjusted.

By forming the semicircular concave 171 onto the side surface in the inner peripheral direction Si of the pickup body 170, the pickup apparatus 200 according to the invention can easily approach the spindle motor 180. In the pickup apparatus 200, as shown in FIG. 4, a distance Ti from each of the linear elastic members 80 and 104 supporting the movable portion 130 to an optical center line (which includes an optical axis of the objective lens 37, and is a line perpendicular to the tracking direction that is referred to as reference character Oc) of the objective lens 37 is shorter than a distance To from each of the linear elastic members 74 and 94 to the optical center line Oc of the objective lens 37. The linear elastic members 74 and 94 and linear elastic members 80 and 104 supporting the movable portion 130 are provided at asymmetrical positions with respect to the optical center line Oc of the objective lens 37, so that the objective lens 37 of the pickup apparatus 200 can approach Thy close to the inner peripheral side of the optical disc.

According to the pickup apparatus 200 of the invention as mentioned above, the semicircular concave 171 is formed on the pickup body 170 and the fixing positions of the four linear elastic members 74, 94, 80, and 104 supporting the movable portion 130 are asymmetrically set with respect to the optical center line Oc of the objective lens 37, thereby allowing the pickup apparatus 200 to approach close to the spindle motor 180 and the inner peripheral side of the optical disc.

Dampers are indicated by reference numerals d1 to d4 which are attached to intermediate points of the linear elastic members 74, 80, 94, and 104 and used for suppressing vibrations which may occur due to warping of each of the elastic member.

Although the movable portion 130 constructed as mentioned above generates an angular moment, the pickup apparatus 200 according to the embodiment of the invention can provide a small size and a light weight by devising a structure of the actuator portion 140 without generating an angular moment. The entire structure of the actuator portion 140 which is used in the pickup apparatus 200 as an embodiment of the invention, therefore, will now be described with reference to FIG. 6 and a structure of each component element constructing the actuator portion 140 will be described in detail hereinbelow.

Figure 6:
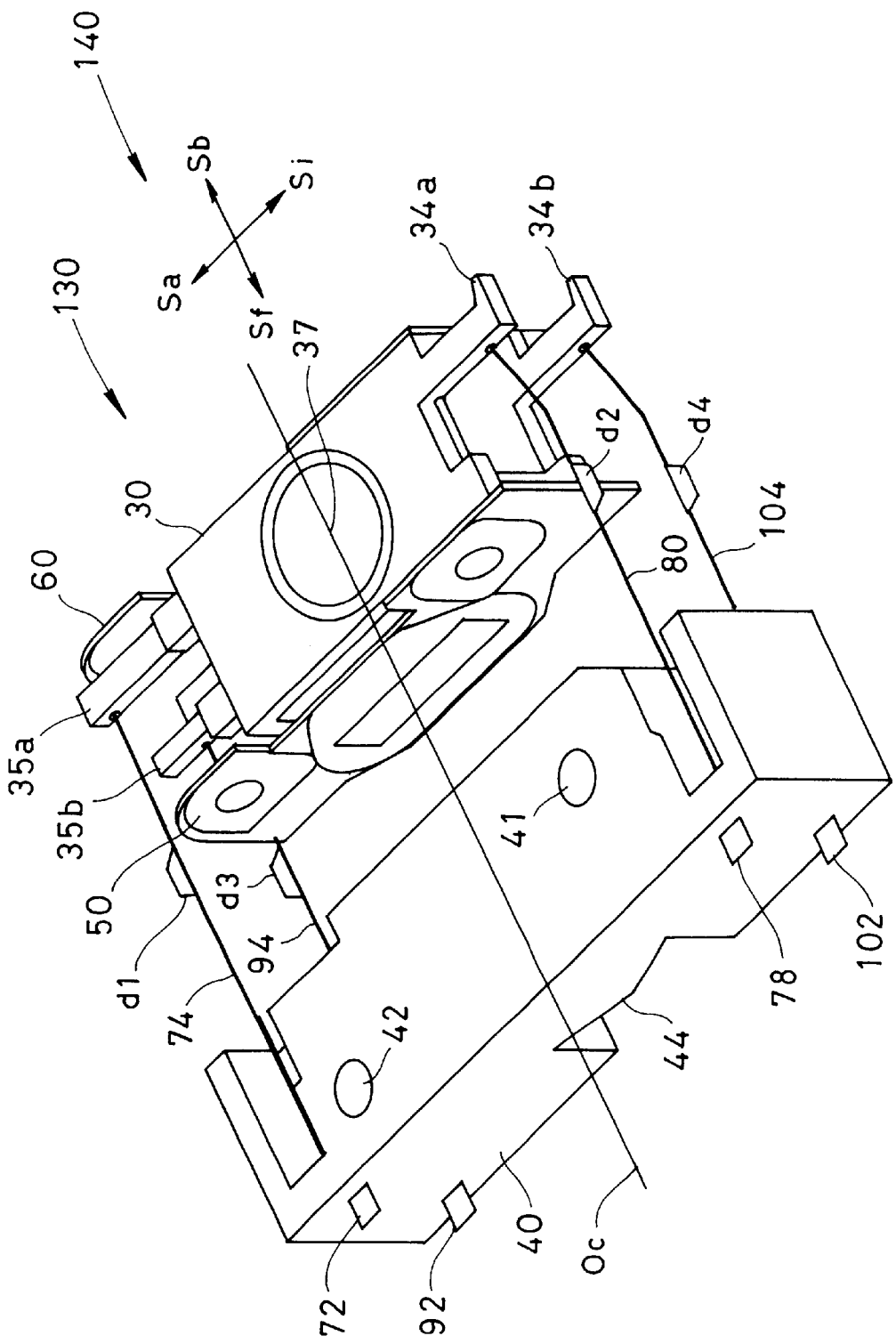
FIG. 6 is a perspective view of an actuator portion included in the pickup apparatus shown in FIGS. 3 to 5.

As shown in FIG. 6, according to the actuator portion 140, the movable portion 130 has a printed circuit board A coil 50 that is fixed to the side surface in the front (shown by an arrow Sf in the diagram) direction of the lens holder 30 that has the objective lens 37 therein. The printed circuit board B coil 60 is fixed to the side surface in the rear (shown by an arrow Sb in the diagram) direction of the lens holder 30. The movable portion 130 is movably supported by the four linear elastic members 74, 80, 94, and 104 fixed to the suspension base 40. The four linear elastic members 74, 80, 94, and 104 constructing the actuator portion 140 are integrally molded by an insertion molding when the lens holder 30 and suspension base 40 are molded with a resin.

Figure 7A:
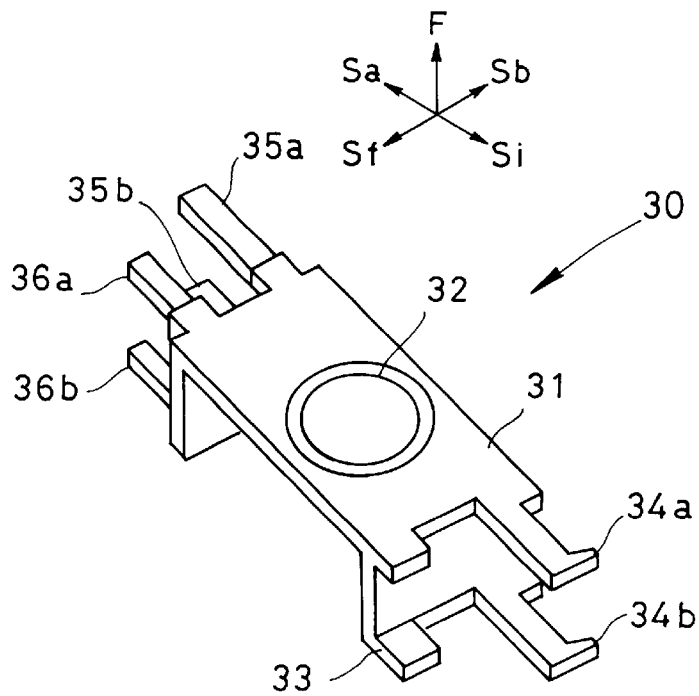
FIGS. 7A and 7B are perspective views of a lens holder and an actuator base constructing a movable portion of the pickup apparatus shown in FIGS. 3 to 5.
Figure 7B:
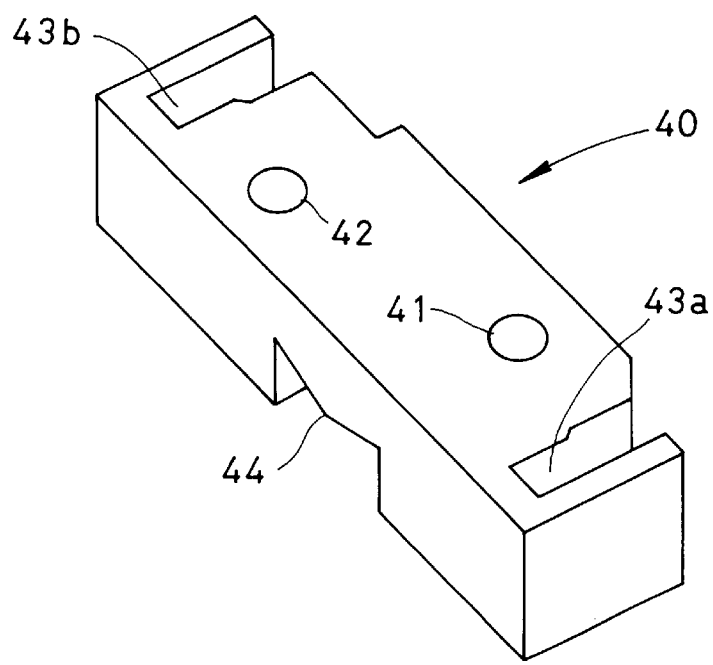

The lens holder 30 and suspension base 40 included in the actuator portion 140 have a structure shown in FIGS. 7A and 7B. FIG. 7A is a perspective view of the lens holder 30. FIG. 7B is a perspective view of the suspension base 40.

The lens holder 30 has an almost square member having an integral hollow structure molded with a resin. An opening window 32 for the objective lens 37 is formed substantially at a center of a top surface 31. The lens holder 30 includes: a pair of fixing arms 34a and 34b as elastic member fixing portions which are located on the rear Sb side of the lens holder 30 and horizontally project in the inner peripheral direction Si from the top surface 31 and a bottom surface 33 located at a position away from the top surface 31 in the focusing (shown by an arrow F in the diagram) direction; a pair of fixing arms 35a and 35b as the other elastic member fixing portions which are located on the rear Sb side of the lens holder 30 and horizontally project in the outer peripheral direction So from the top surface 31 and bottom surface 33; and a pair of projecting portions 36a and 36b which are located on the front Sf side of the lens holder 30 and horizontally project in the outer peripheral direction So from the top surface 31 and bottom surface 33.

The suspension base 40 is made of, for example, a resin. As shown in FIG. 7B, the suspension base 40 is integrally molded with a resin and has an almost rectangular shape including the two attaching holes 41 and 42 formed to fix the suspension base 40 to the actuator base 150; grooves 43a and 43b in which the four linear elastic members 74, 80, 94, and 104 are integrally molded on both sides in the longitudinal direction; and the projecting groove 44 having the V-shaped bottom surface formed in the bottom portion for position adjustment.

Figure 8:
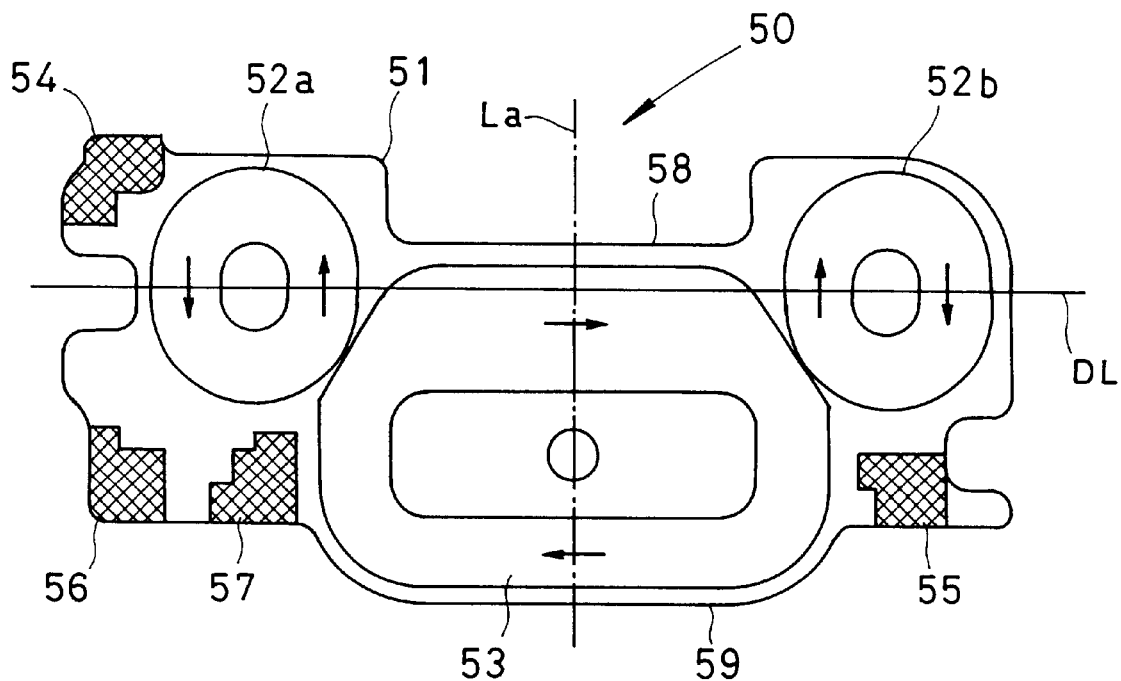
FIG. 8 is a structure diagram of a printed circuit board A coil included in the movable portion of the pickup apparatus shown in FIGS. 3 to 5.
Figure 9:
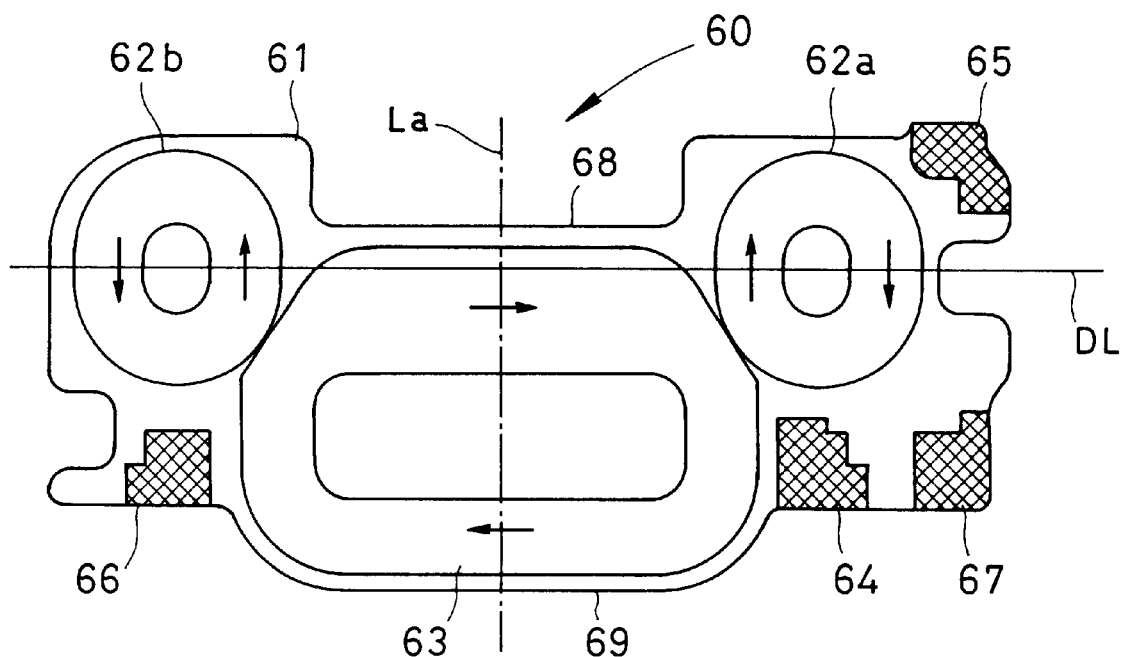
FIG. 9 is a structure diagram of a printed circuit board B coil included in the movable portion of the pickup apparatus shown in FIGS. 3 to 5.

Structures of the printed circuit board A coil 50 and printed circuit board B coil 60 which function as driving coils and are included in the movable portion 130 will now be described with reference to FIGS. 8 and 9. Since the printed circuit board A coil 50 shown in FIG. 8 is fixed to the front Sf side surface of the lens holder 30, coils and terminals, which will be explained hereinlater, are formed on the lens holder 30 side. To enable this state to be easily understood, therefore, a circuit board 51 is shown in a perspective view. That is, the coils and terminals are formed on the same plane existing on the back side of the circuit board. Since the printed circuit board B coil 60 shown in FIG. 9 is fixed to the rear Sb side surface of the lens holder 30, a state where the coils and terminals are formed on the same plane existing on the front side of the paper is shown.

The printed circuit board A coil 50 is provided by forming a coil, a wiring, or the like onto the flat-shaped circuit board 51 by a pattern molding using copper plating as shown in FIG. 8. A tracking A coil 52a, a tracking B coil 52b, a focusing A coil 53, and four terminals formed by copper foil, namely, a tracking A input terminal 54, a tracking A output terminal 55, a focusing A input terminal 56, and a focusing A output terminal 57 are formed on the same plane. The tracking A coil 52a and tracking B coil 52b are arranged in the upper portions of the circuit board 51 and formed in the same shape so as to be symmetrical on the right and left sides with respect to an optical axis La. A center of the focusing A coil 53 is located on a projecting line (an intersecting line of a plane which includes the optical axis La and is perpendicular to the circuit board 51) of the optical axis La and the coil 53 is formed below the operating line DL connecting the coil centers of the tracking A coil 52a and tracking B coil 52b. The circuit board 51 includes an upper portion having a notched portion 58 and a convex portion 59 which has a lower portion that is projected in order to hold a counterweight of the movable portion 130, which will be explained hereinlater.

A line connecting method of the printed circuit board A coil 50 will now be described hereinbelow. The tracking A coil 52a connected to the tracking A input terminal 54 is formed counterclockwise from the outer periphery to the inner periphery and connected to the tracking B coil 52b through a through hole and copper foil (not shown). The tracking B coil 52b is formed clockwise from the inner periphery to the outer periphery and connected to the tracking A output terminal 55. The tracking A coil 52a and tracking B coil 52b, therefore, are serially connected between the tracking A input terminal 54 and tracking A output terminal 55.

The focusing A coil 53 connected to the focusing A input terminal 56 is formed clockwise from the outer periphery to the inner periphery and connected to the focusing A output terminal 57 through a through hole and copper foil.

A printed circuit board B coil 60 shown in FIG. 9 is formed in a manner similar to the printed circuit board A coil 50, namely, a coil, a wiring, or the like is formed on the flat-shaped circuit board 51 by a pattern molding by copper plating. A tracking C coil 62a, a tracking D coil 62b, a focusing B coil 63, and four terminals formed by copper foil, namely, a tracking B input terminal 64, a tracking B output terminal 65, a focusing B input terminal 66, and a focusing B output terminal 67 are formed on the same plane. The tracking C coil 62a and tracking D coil 62b are arranged in upper portions of a circuit board 61 and formed in the same shape so as to be symmetrical on the right and left sides with respect to the projecting line of the optical axis La. A center of the focusing A coil 63 is located on a plane which includes the optical axis La. The focusing A coil 63 is formed below the operating line DL connecting the centers of the tracking C coil 62a and tracking D coil 62b, namely, below the plane including a distribution center of the tracking drive force. In a manner similar to the printed circuit board A coil 50, the circuit board 61 has a notched upper portion 68 and a convex portion 69 whose lower portion is projected.

A line connecting method of the printed circuit board B coil 60 will now be described hereinbelow. The tracking C coil 62a connected to the tracking B input terminal 64 is formed clockwise from the outer periphery to the inner periphery and connected to the tracking D coil 62b through a through hole and copper foil (not shown). The tracking D coil 62b is formed counterclockwise from the inner periphery to the outer periphery and connected to the tracking B output terminal 65. The tracking C coil 62a and tracking D coil 62b, therefore, are serially connected between the tracking B input terminal 64 and tracking B output terminal 65.

The focusing B coil 63 connected to the focusing B input terminal 66 is formed clockwise from the outer periphery to the inner periphery and connected to the focusing B output terminal 67 through a through hole and copper foil.

Figure 10:
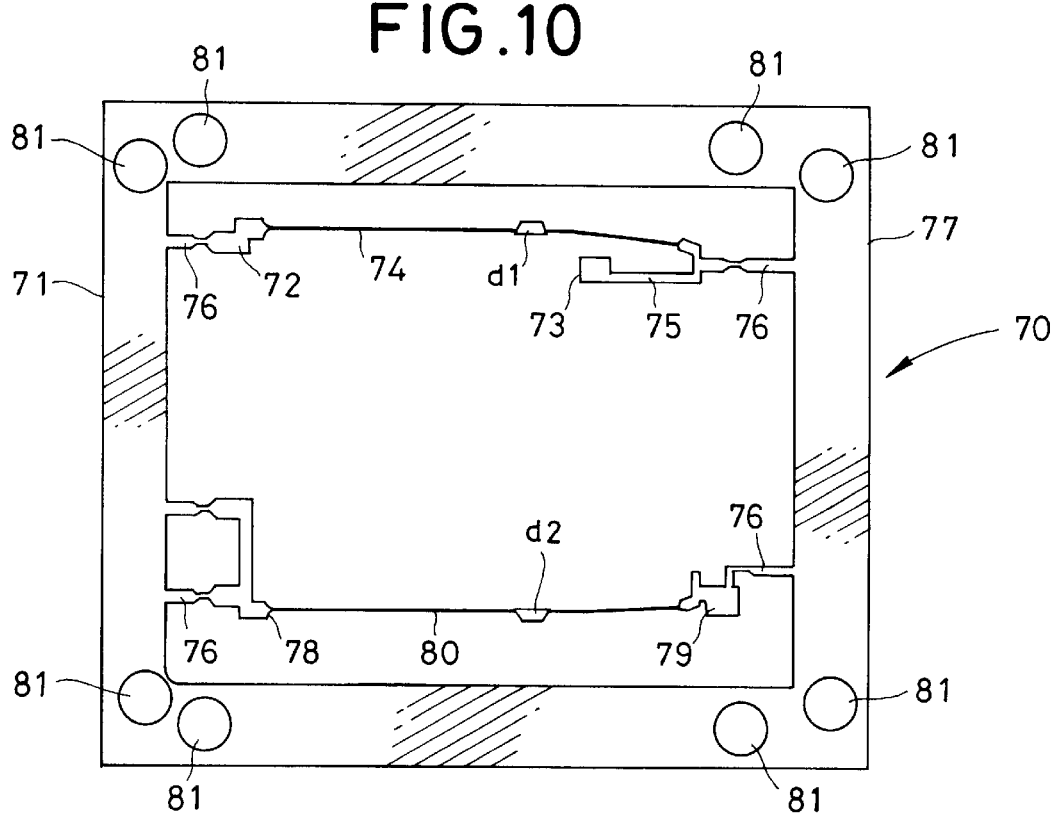
FIG. 10 is a plan view of an upper suspension frame which is used in the movable portion of the pickup apparatus shown in FIGS. 3 to 5.
Figure 11:
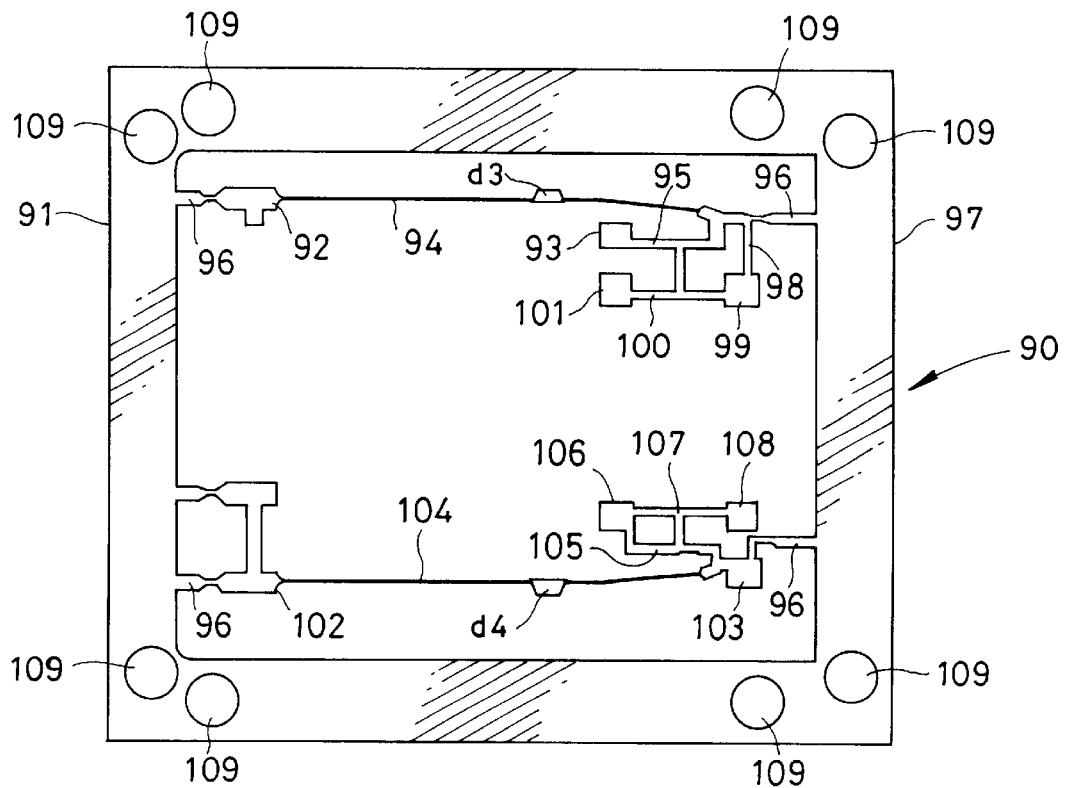
FIG. 11 is a plan view of a lower suspension frame which is used in the movable portion of the pickup apparatus shown in FIGS. 3 to 5.

Structures of the four linear elastic members 74, 80, 94, and 104 which are insertion molded when the lens holder 30 and suspension base 40 are molded with a resin will now be described with reference to FIGS. 10 and 11. FIG. 10 is a plan view of an upper suspension frame 70 in which two linear elastic members 74 and 80 and each connecting portion are formed by punching unnecessary portions of a metal flat-shaped plate by press working or the like. FIG. 11 is a plan view of a lower suspension frame 90 in which two linear elastic members 94 and 104 and each connecting portion are formed by punching unnecessary portions of a metal flat-shaped plate by press working or the like.

The upper suspension frame 70 is arranged on the top surface 31 side of the lens holder 30 when it is integrally molded into the lens holder 30 and holds a tracking input terminal 72 and a tracking output terminal 78, which will be explained hereinlater. The lower suspension frame 90 is arranged on the bottom surface 33 side of the lens holder 30 when it is integrally molded into the lens holder 30 and holds a focusing input terminal 92 and a focusing output terminal 102, which will be explained hereinlater.

Since the upper suspension frame 70 and lower suspension frame 90 have a suspension function and a wiring function for supplying drive currents to the printed circuit board coils 50 and 60, they are formed by metal plates 71 and 91 having a thin plate thickness (for example, about 0.1 mm) made of, for example, titanium copper, phosphor bronze, beryllium copper, or the like having elasticity and good conductivity. Each of the metal plates 71 and 91 is made of an elongated hoop material and formed by coupling the four linear elastic members 74, 80, 94, and 104, connecting portions, and the like to a frame member 77 by a plurality of holding members 76 by punch working by using a die. As for the metal plates 71 and 91, a plurality of plates are formed at a predetermined pitch in consideration of manufacturing steps of producing the plates.

In the upper suspension frame 70, as shown in FIG. 10, the tracking input terminal 72 which is insertion molded into the suspension base 40 and a tracking A input connecting portion 73 which is insertion molded in the lens holder 30 are coupled by the linear elastic member (outer peripheral A wire) 74 and an A coupling portion 75 and held to the frame member 77 by the holding members 76. The tracking output terminal 78 which is insertion molded into the upper suspension base 70 and a tracking B output connecting portion 79 which is insertion molded in the lens holder 30 are coupled by the linear elastic member (inner peripheral A wire) 80 and held to the frame member 77 by the holding members 76. A plurality of fixing holes 81 are formed in the frame member 77 of the upper suspension frame 70 in order to accurately fix them to a predetermined position of the die, which will be explained hereinlater.

In the lower suspension frame 90, as shown in FIG. 11, the focusing input terminal 92 which is insertion molded into the suspension base 40 and a focusing A input connecting portion 93 which is insertion molded in the lens holder 30 are coupled with each other by the linear elastic member (outer peripheral B wire) 94 and a B coupling portion 95. The input terminal 92 and elastic member 94 are held to a frame member 97 by holding members 96. A focusing B input connecting portion 99 coupled with the outer peripheral B wire 94 by a C coupling portion 98 is coupled with a focusing B output connecting portion 101 by a D coupling portion 100.

The focusing output terminal 102 which is insertion molded into the suspension base 40 and a focusing B output connecting portion 103 which is insertion molded in the lens holder 30 are coupled with each other by the linear elastic member, namely, inner peripheral B wire 104. The terminals 102 and 103 are held to the frame member 97 by the holding members 96. The inner peripheral B wire 104 is coupled with a tracking A output connecting portion 106 by an E coupling portion 105. A tracking B input connecting portion 108 is coupled with the tracking A output connecting portion 106 by an F coupling portion 107. A plurality of fixing holes 109 are formed in the frame member 97 of the lower suspension frame 90 in a manner similar to the upper suspension frame 70.

The upper suspension frame 70 and lower suspension frame 90 are formed by the metal plates 71 and 91 having a same plate thickness (H). The outer peripheral A wire 74 of the upper suspension frame 70 and the outer peripheral B wire 94 of the lower suspension frame 90 are formed at the same position with respect to the frame members 77 and 97 so as to have a same plate width (Wo). An inner peripheral B wire 80 of the upper suspension frame 70 and the inner peripheral B wire 104 of the lower suspension frame 90 are formed at the same position with respect to the frame members 77 and 97 so as to have a same plate width (Wi). Although the details will be explained hereinlater, the plate width (Wo) of each of the outer peripheral A wire 74 of the upper suspension frame 70 and the outer peripheral B wire 94 of the lower suspension frame 90 is narrower than the plate width (Wi) of each of the inner peripheral B wire 80 of the upper suspension frame 70 and the inner peripheral B wire 104 of the lower suspension frame 90. The structure of each member constructing the actuator portion 140 has been described above.

Figure 12:
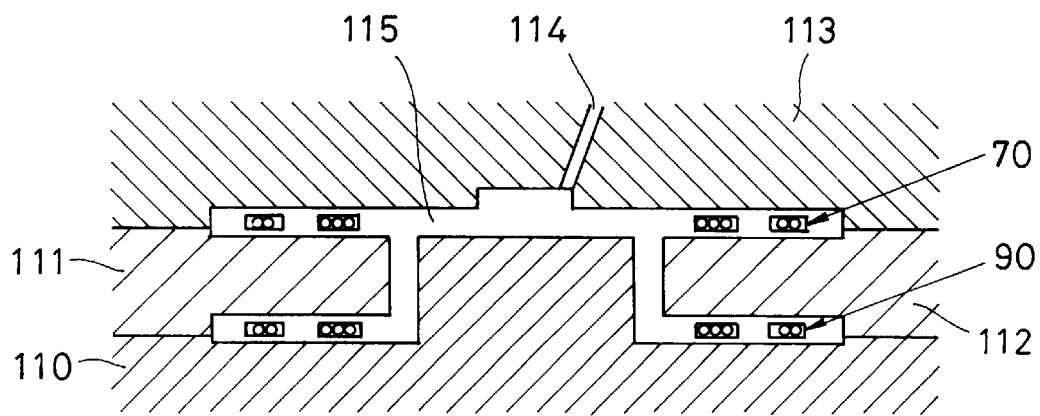
FIG. 12 is a cross sectional view of a main portion of a die in case of molding a suspension unit.
Figure 13:
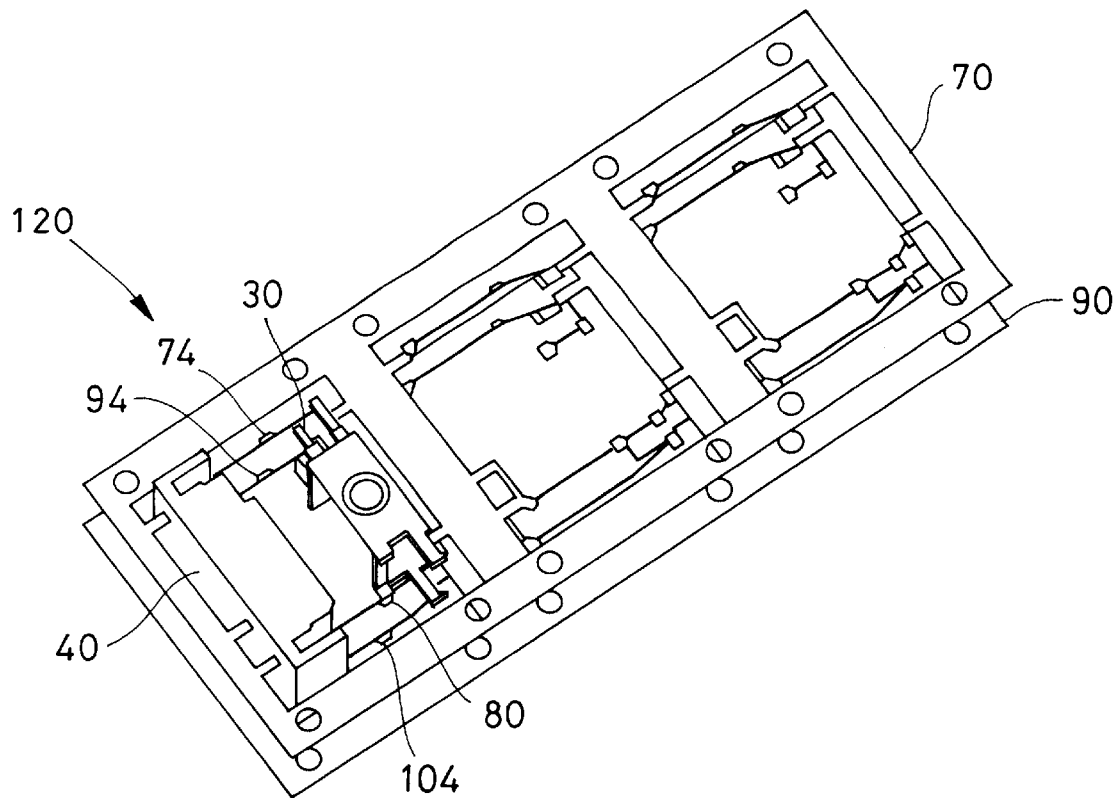
FIG. 13 is a perspective view showing two sheets of assemblies each of which is formed by coupling a plurality of suspension units.

Manufacturing steps of the actuator portion 140 will now be described with reference to FIGS. 12 to 17C. First, a structure of a die which is used when the lens holder 30 and suspension base 40 are integrally molded by using the upper suspension frame 70 and lower suspension frame 90 and a resin molding procedure will be described with reference to FIG. 12. Although the die is constructed by integrally forming resin spaces of the lens holder 30 and suspension base 40, for simplicity of explanation, FIG. 12 is a structure diagram of a main portion of the die showing only the portion of the lens holder 30 and the detailed portions are omitted here.

The die comprises four dies of a lower fixing die 110, a pair of dies formed by a left movable die 111 and a right movable die 112, and an upper movable die 113. An injecting hole 114 for injecting a resin is formed in the upper movable die 113. The lower suspension frame 90 is first fixed to the die.

The lower suspension frame 90 is fixed at a predetermined position of the lower fixing die 110 of the die. Since positioning pins (not shown) are formed on the lower fixing die 110, the lower suspension frame 90 is accurately positioned to the lower fixing die 110 by inserting the positioning pins into the fixing holes 109 of the lower suspension frame 90. Subsequently, the left movable die 111 and right movable die 112 are put at predetermined positions of the lower fixing die 110 so as to sandwich the lower suspension frame 90. The upper suspension frame 70 is fixed to predetermined positions of the left movable die 111 and right movable die 112. In a manner similar to the lower fixing die 110, since positioning pins (not shown) are formed on the left movable die 111 or right movable die 112, the upper suspension frame 70 is accurately positioned to the left movable die 111 and right movable die 112 by inserting those positioning pins into the fixing holes 81 of the upper suspension frame 70. Finally, the upper movable die 113 is put on the left movable die 111 and right movable die 112 so as to sandwich the upper suspension frame 70. The enclosure of the upper suspension frame 70 and lower suspension frame 90 into the die is completed in this manner. A resin space 115 for the lens holder 30 is formed so as to surround the upper suspension frame 70 and lower suspension frame 90. The above procedure corresponds to the first step.

Subsequently, a resin is filled into the resin space 115 via the injecting hole 114. When the resin is cured and the molding of the lens holder 30 and suspension base 40 is completed, the die is disassembled by a procedure opposite to an assembling procedure of the die. At this time, the left movable die 111 and right movable die 112 are removed by sliding to the left and right, respectively. The left movable die 111 and right movable die 112 are fixed in a position where they were moved to the left and right. After a damping material of an ultraviolet hardening resin is coated onto grooves 43a and 43b formed on both side surfaces of the suspension base 40, the dies 111 and 112 are removed. FIG. 11 shows a state where the dies 111 and 112 are removed from the die. The lens holder 30 and suspension base 40 are integrally molded into the upper suspension frame 70 and lower suspension frame 90, so that a plurality of suspension units 120 formed in a ladder-shape are completed. The above procedure corresponds to the second step.

Prior to explaining the third step of connecting the terminal portions of the printed circuit board A coil 50 and printed circuit board B coil 60 (hereinafter, simply referred to as two printed circuit board coils 50 and 60) to the four linear elastic members 74, 80, 94, and 104 fixed to the lens holder 30 and connecting portions, a step of cutting the adjacent frame members 77 and 97 of the upper suspension frame 70 and lower suspension frame 90 and cutting the unnecessary members is provided. This step will be described hereinbelow with reference to FIGS. 14 and 15.

Figure 14:
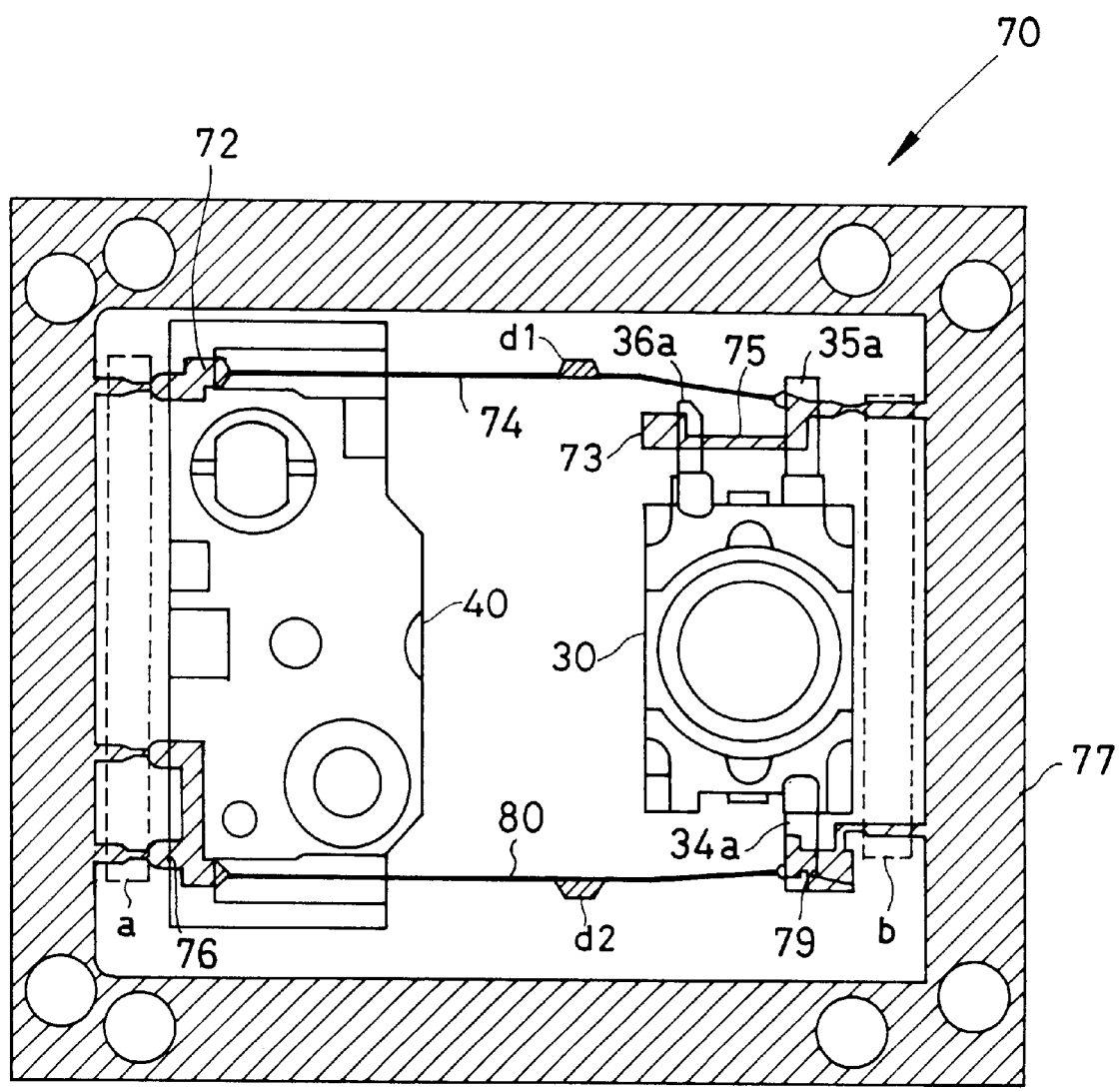
FIG. 14 is a plan view showing an upper suspension frame which is formed by integrally molding the lens holder and suspension base.
Figure 15:
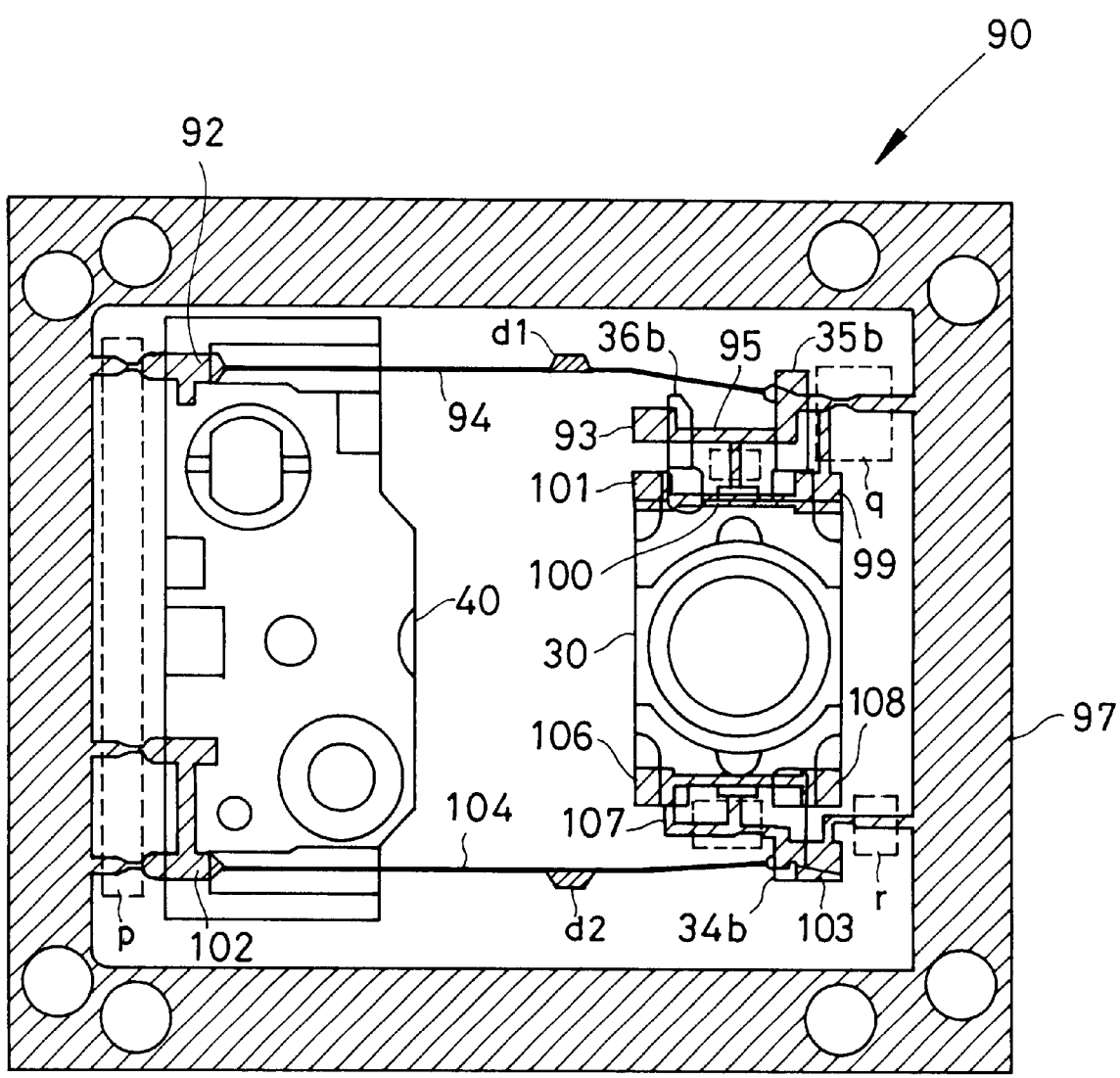
FIG. 15 is a plan view showing a lower suspension frame which is formed by integrally molding the lens holder and suspension base.

FIG. 14 is a plan view perspectively showing a state where the lens holder 30 and suspension base 40 are integrally molded into the upper suspension frame 70. As for the lens holder 30, a pair of left and right fixing arms 34a and 35a formed on the top surface 31 side and the projecting portion 36a are illustrated. As shown in FIG. 14, the outer peripheral A wire 74, inner peripheral A wire 80, and parts of the coupling members and the like are enclosed by a resin and fixed in a state where a front edge portion of each connecting portion is exposed from the resin. FIG. 15 is a plan view perspectively showing a state where the lens holder 30 and suspension base 40 are integrally molded into the lower suspension frame 90. As for the lens holder 30, a pair of left and right fixing arms 34b and 35b formed on the bottom surface 33 side and the projecting portion 36b are illustrated. As shown in FIG. 15, the outer peripheral B wire 94, inner peripheral B wire 104, and parts of the coupling members and the like are enclosed by a resin and fixed in a state where a front edge portion of each connecting portion is exposed from the resin.

By removing portions shown by broken line frames in the diagram of the upper suspension frame 70 and lower suspension frame 90, the frames 70 and 90 are detached from the frame members 77 and 97 in a state where the lens holder 30 and suspension base 40 have been coupled with the four linear elastic members 74, 80, 94, and 104, so that the suspension unit 120 is obtained.

Two portions shown by broken line frames a and b in the diagram of the upper suspension frame 70 are removed by laser cutting or punching working as shown in FIG. 14. The outer peripheral A wire 74 coupled with the tracking input terminal 72, which is integrally molded to the suspension base 40 and detached from the frame member 77, is detached from the frame member 77 and fixed to the fixing arm 35a of the lens holder 30. The tracking A input connecting portion 73 coupled with the A coupling portion 75 is fixed to the projecting portion 36a in a state where it is exposed to the front side surface of the lens holder 30. The inner peripheral A wire 80 coupled with the tracking output terminal 76 which is integrally molded to the suspension base 40 and is detached from the frame member 77 and fixed to the fixing arm 34a of the lens holder 30. The tracking B output connecting portion 79 coupled with the inner peripheral A wire 80 is fixed in a state where it is exposed to the rear side surface of the lens holder 30.

With respect to the lower suspension frame 90, five portions shown by broken line frames p to r in the diagram are removed by a similar method as shown in FIG. 15. The outer peripheral B wire 94 coupled with the focusing input terminal 92, which is integrally molded to the suspension base 40 and detached from the frame member 97, is detached from the frame member 77 and fixed to the fixing arm 35b of the lens holder 30. The focusing A input connecting portion 93 coupled by the B coupling portion 95 is fixed to the projecting portion 36b in a state where it is exposed to the front side surface of the lens holder 30. The focusing B input connecting portion 99 detached from the outer peripheral B wire 94 is fixed in a state where it is exposed to the rear side surface of the lens holder 30. The focusing B output connecting portion 101 coupled with the focusing B input connecting portion 99 by the D coupling portion 100 is fixed in a state where it is exposed to the front side surface of the lens holder 30.

The inner peripheral B wire 104 coupled with the focusing output terminal 102 which is integrally molded to the suspension base 40 and detached from the frame member 97 is detached from the frame member 77 and fixed to the fixing arm 34b of the lens holder 30. The focusing B output connecting portion 103 coupled with the inner peripheral B wire 104 is fixed in a state where it is exposed to the rear side surface of the lens holder 30. The tracking B input connecting portion 108 detached from the frame member 97 is fixed in a state where it is exposed to the rear side surface of the lens holder 30. The tracking A output connecting portion 106 coupled with the tracking B input connecting portion 108 by the F coupling portion 107 is fixed in a state where it is exposed to the front side surface of the lens holder 30.

A method of connecting the lens holder 30 to the two printed circuit board coils 50 and 60 as a third step mentioned above will now be described with reference to FIG. 16. To enable a structure of a soldering portion to be easily understood, FIG. 16 shows a state where the printed circuit board A coil 50 and printed circuit board B coil 60 are arranged at the positions away from both side surfaces of the lens holder 30 and each connecting portion integrally molded to the lens holder 30 is diagrammatically extended (portions shown by broken lines in the diagram).

Each connecting portion of the lens holder 30 having the objective lens 37 therein is formed in a positional relational manner so as to be in contact with each terminal formed on the printed circuit board A coil 50 and printed circuit board B coil 60, so that the printed circuit board A coil 50 and printed circuit board B coil 60 are fixed to predetermined positions of the lens holder 30.

Figure 16:
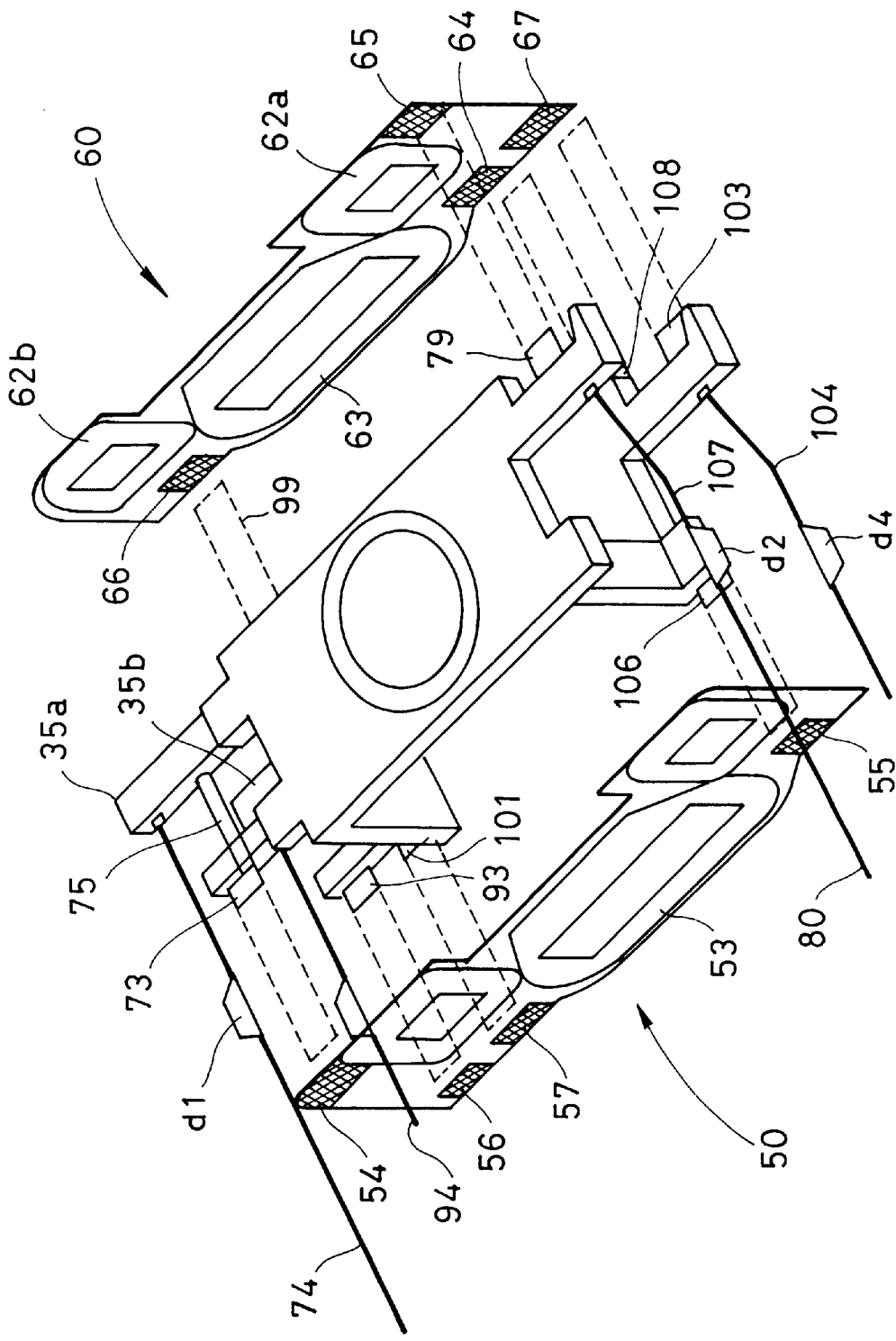
FIG. 16 is an exploded perspective view of the movable portion and actuator portion in case of connecting the printed circuit board coils to the suspension unit.

Specifically speaking, as shown in FIG. 16, the four terminal portions of the printed circuit board A coil 50, namely, the tracking A input terminal 54, tracking A output terminal 55, focusing A input terminal 56, and focusing A output terminal 57 are formed in a positional relation so as to be in contact with the end faces of the four terminal portions formed so as to be exposed to the front side surface of the lens holder 30, namely, the tracking A input connecting portion 73, focusing A input connecting portion 93, focusing B output connecting portion 101, and tracking A output connecting portion 106 so that each of the terminals are fixed to predetermined positions on the front side surface of the lens holder 30. The four terminal portions of the printed circuit board B coil 60, namely, the tracking B input terminal 64, tracking B output terminal 65, focusing B input terminal 66, and focusing B output terminal 67 are formed in a positional relation so as to be in contact with the end faces of the four connecting portions formed so as to be exposed to the rear side surface of the lens holder 30, namely, the tracking B output connecting portion 79, focusing B input connecting portion 99, focusing B output connecting portion 103, and tracking B input connecting portion 108. The actuator portion 140, therefore, is formed by soldering them, as described below.

The outer peripheral A wire 74 connected to the tracking input terminal 72 is connected to the tracking A input terminal 54 through the A coupling portion 75. The tracking A input terminal 54 is soldered to the tracking A input terminal 54 of the printed circuit board A coil 50. The tracking A output terminal 55 of the printed circuit board A coil 50 is soldered to the tracking A output connecting portion 106 of the lens holder 30. The tracking B input connecting portion 108 of the lens holder 30 connected to the tracking A output connecting portion 106 by the F coupling portion 107 is soldered to the tracking B input terminal 64 of the printed circuit board B coil 60. The inner peripheral A wire 80 connected to the tracking output terminal 78 is connected to the tracking B output connecting portion 79. The tracking B output connecting portion 79 is soldered to the tracking B output terminal 65 of the printed circuit board B coil 60.

Since the tracking A coil 52a and tracking B coil 52b of the printed circuit board A coil 50 are serially connected between the tracking A input terminal 54 and tracking A output terminal 55 and the tracking C coil 62a and tracking D coil 62b of the printed circuit board B coil 60 are serially connected between the tracking B input terminal 64 and tracking B output terminal 65 as mentioned above, the four tracking coils 52a, 52b, 62a, and 62b are serially connected between the tracking input terminal 72 and tracking output terminal 78.

The outer peripheral B wire 94 connected to the focusing input terminal 92 is connected to the focusing A input connecting portion 93 through the B coupling portion 95. The focusing A input connecting portion 93 is soldered to the focusing A input terminal 56 of the printed circuit board A coil 50. The focusing A output terminal 57 of the printed circuit board A coil 50 is soldered to the focusing B output connecting portion 101 of the lens holder 30. The focusing B input connecting portion 99 of the lens holder 30 connected to the focusing B output connecting portion 101 by the D coupling portion 100 is soldered to the focusing B input terminal 66 of the printed circuit board B coil 60. The inner peripheral B wire 104 connected to the focusing output terminal 102 is connected to the focusing B output connecting portion 103. The focusing B output connecting portion 103 is soldered to the focusing B output terminal 67 of the printed circuit board B coil 60.

Since the focusing A coil 53 of the printed circuit board A coil 50 is connected between the focusing A input terminal 56 and focusing A output terminal 57 and the focusing B coil 63 of the printed circuit board B coil 60 is connected between the focusing B input terminal 66 and focusing B output terminal 67 as mentioned above, the focusing A coil 53 and focusing B coil 63 are serially connected between the outer peripheral B wire 94 and inner peripheral B wire 104. The above procedure relates to the third step.

As described above, in the actuator portion 140 which is used in the pickup apparatus 200 according to the embodiment of the invention, since the four linear elastic members 74, 80, 94, and 104 are molded integrally with the lens holder 30 and actuator base 40, and each coupling portion for connecting the printed circuit board A coil 50 and printed circuit board B coil 60 is integrally molded, there is no need to connect these elements externally by using wiring materials. The working steps, therefore, are simplified and a highly reliable actuator portion 140 can be obtained provided.

Figure 17A:
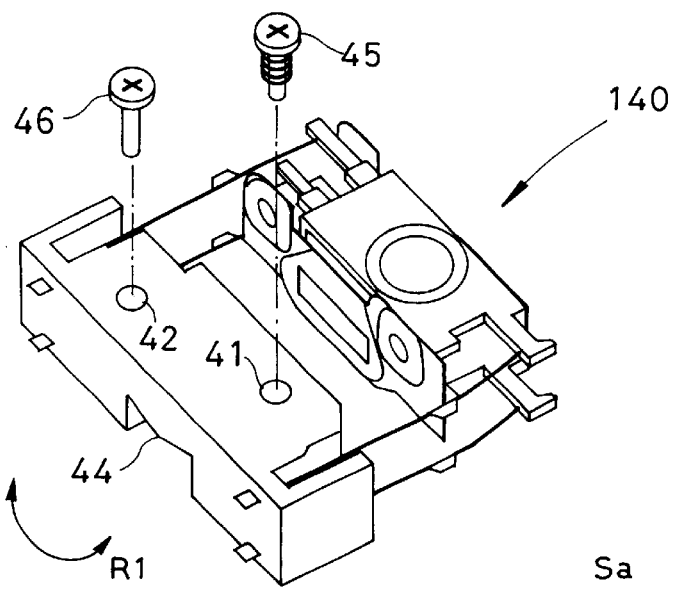
FIGS. 17A to 17C are exploded perspective views showing a procedure for assembling the actuator portion to the suspension base.
Figure 17B:
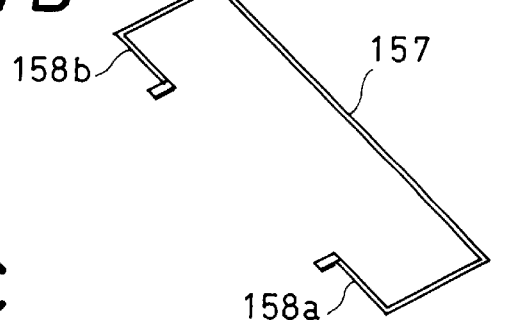
Figure 17C:
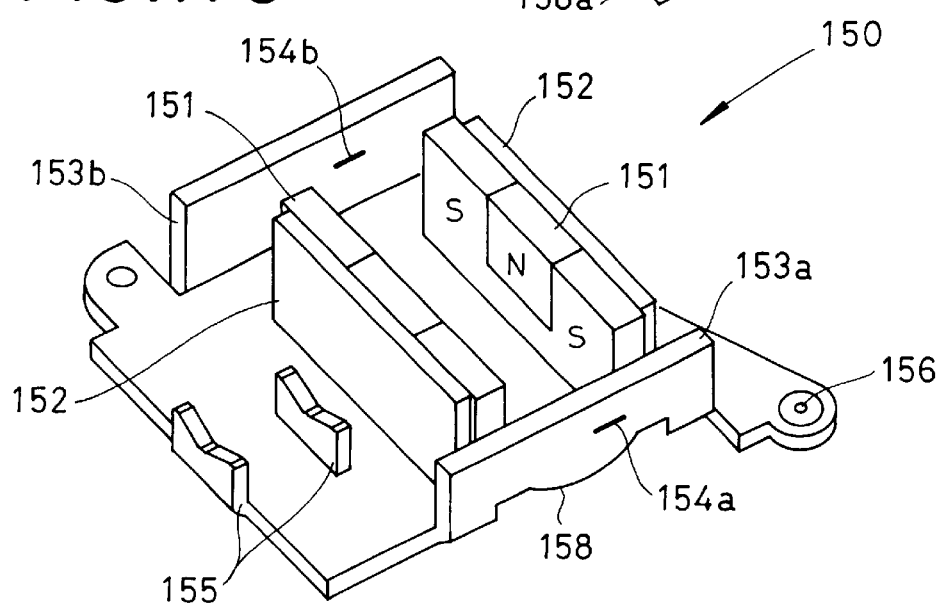

A procedure for assembling the actuator portion 140 to the suspension base 150 will now be described with reference to FIGS. 17A to 17C. FIG. 17A shows a perspective view of the actuator portion 140. FIG. 17B shows a perspective view of a stopper member 157. FIG. 17C shows a perspective view of the actuator base 150.

As mentioned above, as for the actuator portion 140, the projecting groove 44 having a V-shaped bottom surface is put on the two projecting plates 155 each having an M-shaped concave apex portion on the suspension base 150, their positions are adjusted by a screw 45 with a spring and a fixing screw 46, and there after, the actuator portion 140 is fixed. The movable portion 130, therefore, is movably supported between the pair of magnets 151. After that, the stopper member 157 is inserted into inserting holes 154a and 154b of the pair of standing portions 153a and 153b formed on the suspension base 150 so as to surround the movable portion 130.

The stopper member 157 is a linear member that is bent in substantially a C-shape as shown in FIG. 17B. Retaining portions 158a and 158b projecting toward the inside of the standing portions 153a and 153b, namely, toward the movable portion 130 side are formed at edges of the C-shaped stopper member. The stopper member 157 is inserted into the inserting holes 154a and 154b of the standing portions 153a and 153b, and the edges of both of the retaining portions 158a and 158b are inserted from the outside of the standing portions 153a and 153b. The stopper member 157 is made of an elastic member having a spring effect.

As for the actuator portion 140 put on the suspension base 150, a moving range in the tracking direction of the movable portion 130 is restricted by the pair of standing portions 153a and 153b formed so as to surround the movable portion 130, and a moving range in the focusing direction of the movable portion 130 is restricted by the stopper member 157.

Figure 18A:
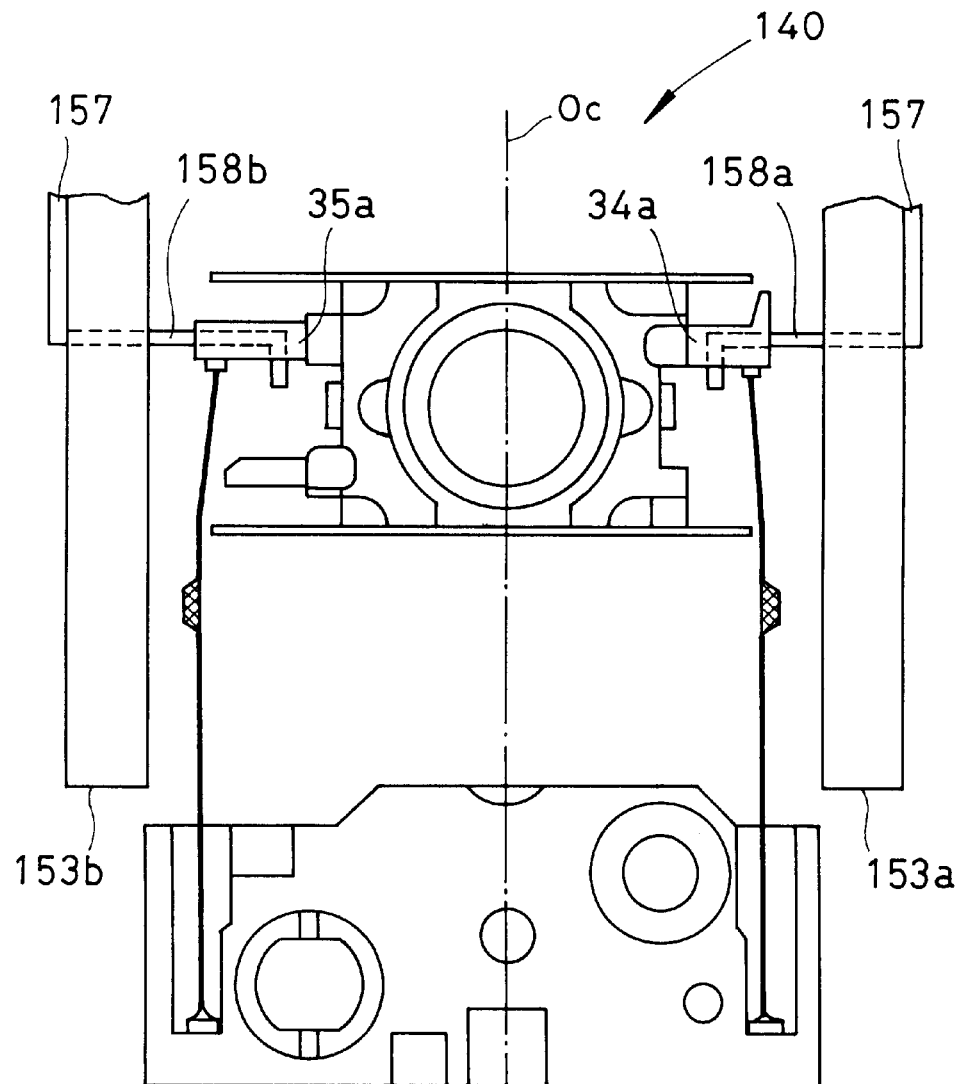
FIGS. 18A and 18B are a plan view and a cross sectional view of the movable portion including a stopper member.
Figure 18B:
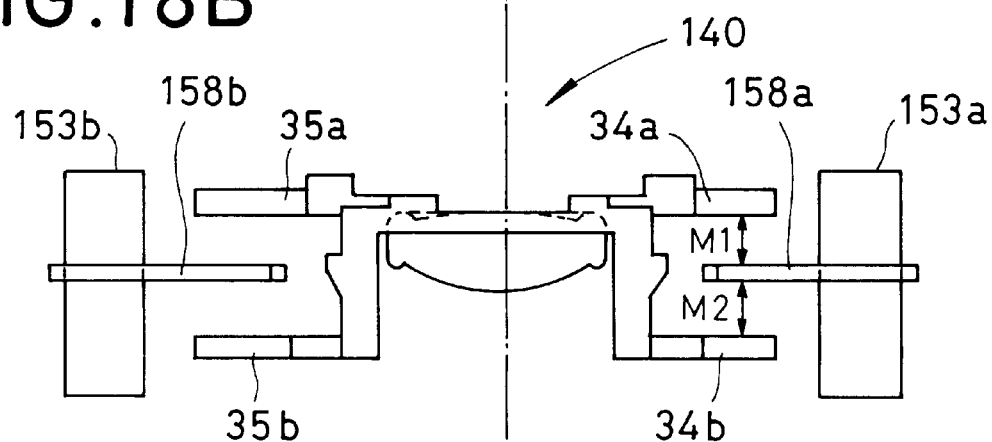

Specifically speaking, explanation will be made with reference to FIGS. 18A and 18B. FIG. 18A is a plan view showing a positional relation among the actuator portion 140 and the standing portions 153a and 153b and stopper member 157 of the suspension base 150. FIG. 18B is a side elevational view showing a positional relation of the lens holder 30 having the objective lens 37 therein, standing portions 153a and 153b, and stopper member 157.

As shown in FIGS. 18A and 18B, when the stopper member 157 is inserted into the inserting holes 154a and 154b of the standing portions 153a and 153b, one retaining portion 158a of the stopper member 157 is arranged almost at the center of the fixing arms 34a and 34b formed on the lens holder 30 so as to be spaced away from each other in the focusing direction. The other retaining portion 158b of the stopper member 157 is arranged almost at the center of the other fixing arms 35a and 35b formed on the lens holder 30 so as to be spaced away from each other in the focusing direction. When the movable portion 130 is driven in the upward focusing direction, therefore, its moving range is restricted by a distance M2 which is specified until the left and right fixing arms 34b and 35b formed on the bottom surface 33 side of the lens holder 30 are brought into contact with the retaining portions 158a and 158b. When the movable portion 130 is driven in the downward focusing direction, its moving range is restricted by a distance M1 which is specified until the left and right fixing arms 34a and 35a formed on the top surface 31 side of the lens holder 30 are brought into contact with the retaining portions 158a and 158b. Since the fixing arms 35a and 35b as fixing units of the elastic members are used as a mechanism for restricting the moving range in the focusing direction, the reduction of the costs is realized.

Figure 19:
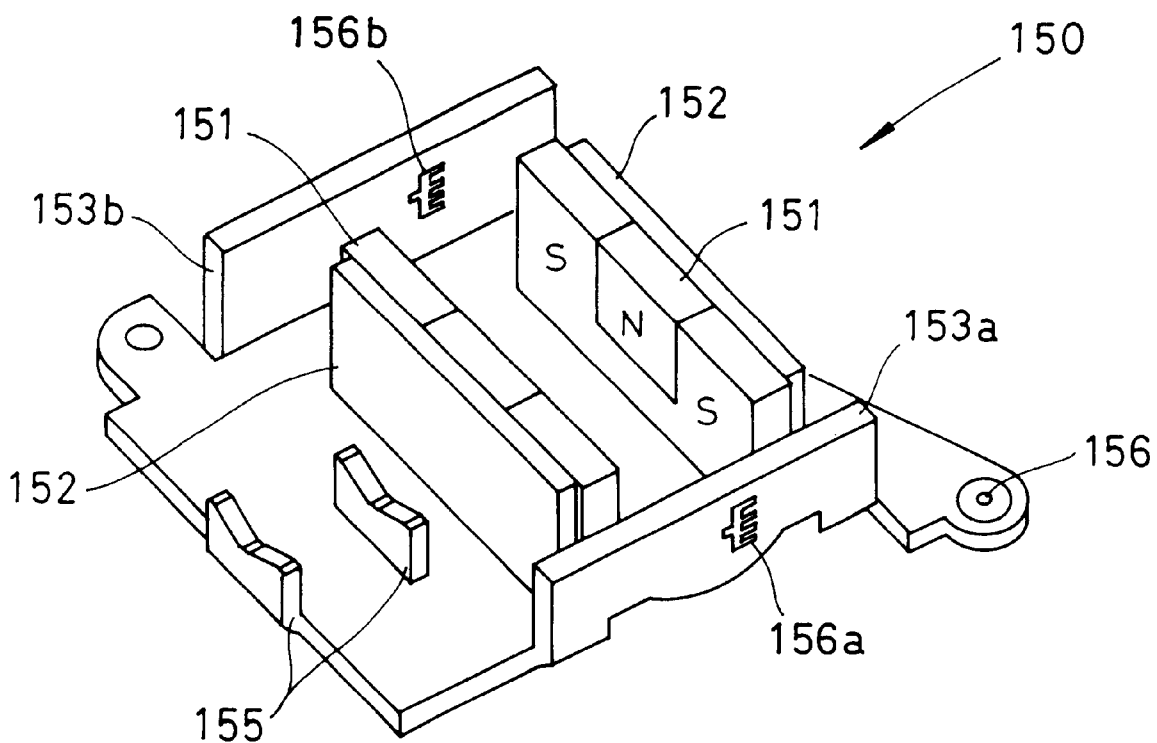
FIG. 19 is a perspective view showing another example of the movable portion.

As with inserting holes 154a and 154b formed in the standing portions 153a and 153b, a pair of inserting holes 156a and 156b which define a plurality of inserting positions can be also formed as shown in FIG. 19. With this construction, the upward moving range and downward moving range of the movable portion 130 can be specified to different moving ranges, thereby enhancing the useful range and general applicability of the suspension base 150.

As described above, after the actuator portion 140 is fixed to the suspension base 150, the stopper member 157 is inserted into the inserting holes 154a and 154b of the standing portions 153a and 153b. By fixing the suspension base 150 to the pickup body 170, the pickup apparatus 200 of the embodiment of the invention is completed.

As mentioned above, according to the movable portion 130 constructing the pickup apparatus 200 of the embodiment of the invention, the moving range in the tracking direction is restricted by the standing portions 153a and 153b of the suspension base 150 and the moving range in the focusing direction is restricted by the stopper member 157. The pickup apparatus 200 of the embodiment of the invention does not need an actuator cover. Therefor, the pickup apparatus 200 can be provided in a small size and a light weight.

Figure 20:
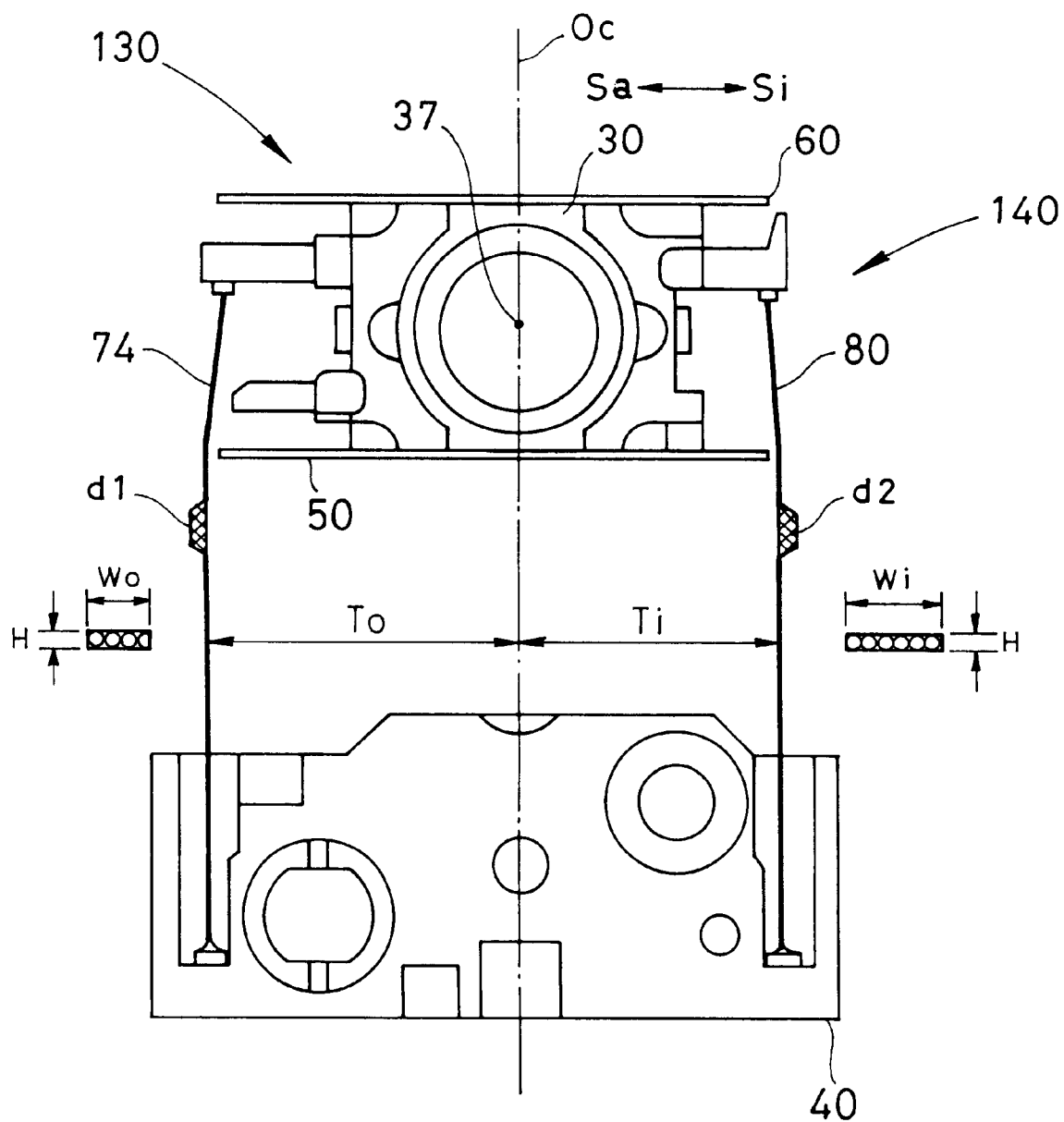
FIG. 20 is a plan view of the movable portion for explaining suppression of an angular moment.
Figure 21:
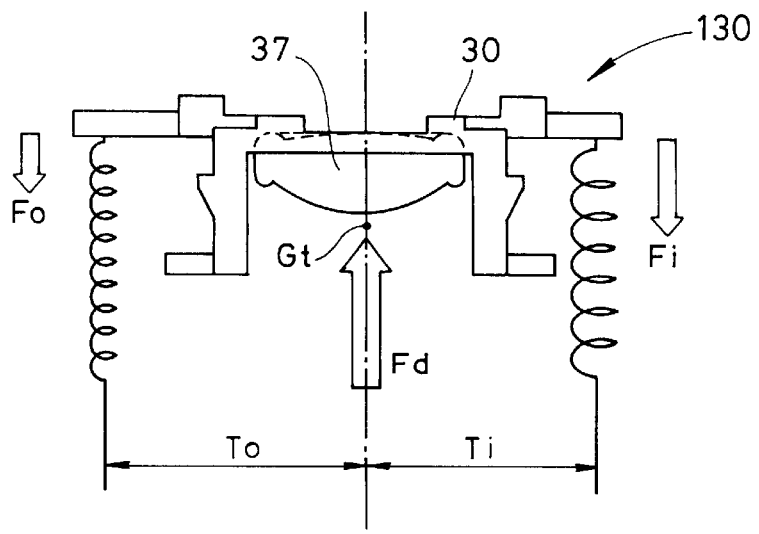
FIG. 21 is a cross sectional view of the movable portion for explaining the suppression of the angular moment.

A construction of the four linear elastic members 74, 94, 80, and 104 which support the movable portion 130 and the operation for preventing rolling of the movable portion 130 will now be described with reference to FIGS. 20 and 21. Although the movable portion 130 is actually supported by the four linear elastic members 74, 94, 80, and 104, a state where only the outer peripheral A wire 74 and inner peripheral A wire 80 are used is illustrated to avoid complication of the explanation. Discussion of only wires 74 and 80, there is no difference in the operation. FIG. 20 is a plan view of the actuator portion 140. FIG. 21 is a schematic diagram for explaining an angular moment of the movable portion 130.

As mentioned above, according to the pickup apparatus 200 of the embodiment of the invention, as shown in FIG. 20, the distance Ti from the inner peripheral A wire 80 supporting the movable portion 130 to the optical center line Oc of the objective lens 37 is set to be shorter than the distance To from the outer peripheral A wire 74 to the optical center line Oc of the objective lens 32. In association with it, although the inner peripheral A wire 80 and outer peripheral A wire 74 are formed so as to have the same plate thickness H, the plate width Wi of the inner peripheral A wire 80 is set to be wider than the plate width Wo of the outer peripheral A wire 74 (Wi>Wo).

A spring constant Ki of the inner peripheral A wire 80 is shown by the following expression (1).

$$Ki\ Ti^3 H \qquad (1)$$

Similarly, a spring constant Ko of the outer peripheral A wire 74 is shown by the following expression (2).

$$Ko\ To^3 H \qquad (2)$$

The spring constant Ki of the inner peripheral A wire 80 is, therefore, larger than the spring constant Ko of the outer peripheral A wire 74 (Ki>Ko) from the relation of Wi>Wo mentioned above.

When a deflection amount in the focusing direction of the inner peripheral A wire 80 and outer peripheral A wire 74 in the case where the movable portion 130 is deviated in the focusing direction due to a drive force Fd (assumed to be x in the equation (3) below), as shown in FIG. 21, a restoring force Fi of the inner peripheral A wire 80 is shown by the following equation (3).

$$Fi = Ki \cdot x \qquad (3)$$

A restoring force Fo of the outer peripheral A wire 74 is similarly shown by the following equation (4).

$$Fo = Ko \cdot x \qquad (4)$$

From the relation of Ki>Ko, the restoring force Fi of the inner peripheral A wire 80 is larger than the restoring force Fo of the outer peripheral A wire 74 (Fi>Fo).

The angular moment of the movable portion 130 is obtained by the product of the distance from the center Gt of gravity of the movable portion 130 (the operating point of the focusing drive force and the center Gt of gravity of the movable portion 130 exist on the optical axis La) to each of the inner peripheral A wire 80 and the outer peripheral A wire 74 and the restoring force at the position where each of the inner peripheral A wire 80 and the outer peripheral A wire 74 is fixed. If the angular moment due to the restoring force Fi which is applied to the inner peripheral A wire 80 and the angular moment due to the restoring force Fo which is applied to the outer peripheral A wire 74 are balanced, the angular moment is equal to 0 and the movable portion 130 does not rotate.

From the above principle, the plate width Wi of the inner peripheral A wire 80 and the plate width Wo of the outer peripheral A wire 74 are set to a relation shown by the following equation (5).

$$Fi \cdot Ti = Fo \cdot To \qquad (5)$$

As described above, according to the pickup apparatus 200 of the invention, the distance Ti from each of the inner peripheral A wires 80 and 104 supporting the movable portion 130 to the optical center line Oc of the objective lens 37 is set to be smaller than the distance To from each of the outer peripheral A wires 74 and 94 to the optical center line Oc of the objective lens 37, and the plate width Wi of each of the inner peripheral A wires 80 and 104 is set to be wider than the plate width Wo of each of the outer peripheral A wires 74 and 94, so that a rolling movement is not created by the angular moment of the movable portion 130. The inner peripheral side of the actuator portion 140, namely, the spindle motor 180 side can be constructed smaller than the outer peripheral side, thereby enabling the objective lens to approach the inner peripheral side of the optical disc.

Figure 22:
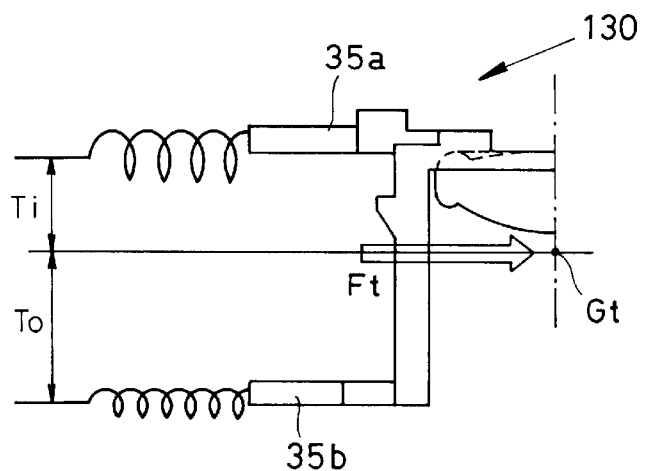
FIG. 22 is a cross sectional view showing a part of a supporting portion of the movable portion for explaining the suppression of the angular moment.

The setting of or making the spring coefficients of the four linear elastic members 74, 94, 80, and 104 different, as mentioned above, is not limited to the inner peripheral side and outer peripheral side but spring constants of the linear elastic members 74 and 80 on the upper side in the focusing direction and those of the linear elastic members 94 and 104 on the lower side can be also made different. That is, as shown in FIG. 22, in the case where the distance Ti from the center Gt of gravity of the movable portion 130 to each of the upper linear elastic members 74 and 80 and the distance To from the center Gt of gravity to each of the lower linear elastic members 94 and 104 are different and the center Gt of gravity is driven in the tracking direction by the drive force Ft, in order to suppress the generation of the angular moment due to the restoring force of the springs, it is sufficient to properly set the spring constants of the upper linear elastic members 74 and 80 and the spring constants of the lower linear elastic members 94 and 104 so as to satisfy the equation (5).

It is not always necessary to satisfy the equation (5) when the spring constants are set. So long as the spring constants are made different and set so as to reduce the angular moment which is applied to the movable portion as compared with the case where all of the spring constants are equal, such a construction can contribute to the suppression of the rolling movement.

Figure 23:
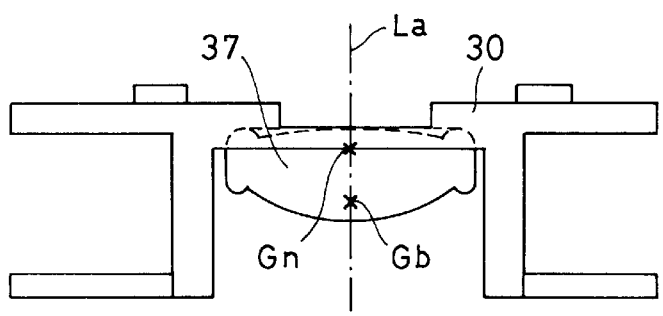
FIG. 23 is a cross sectional view showing a part of the movable portion.
Figure 24:
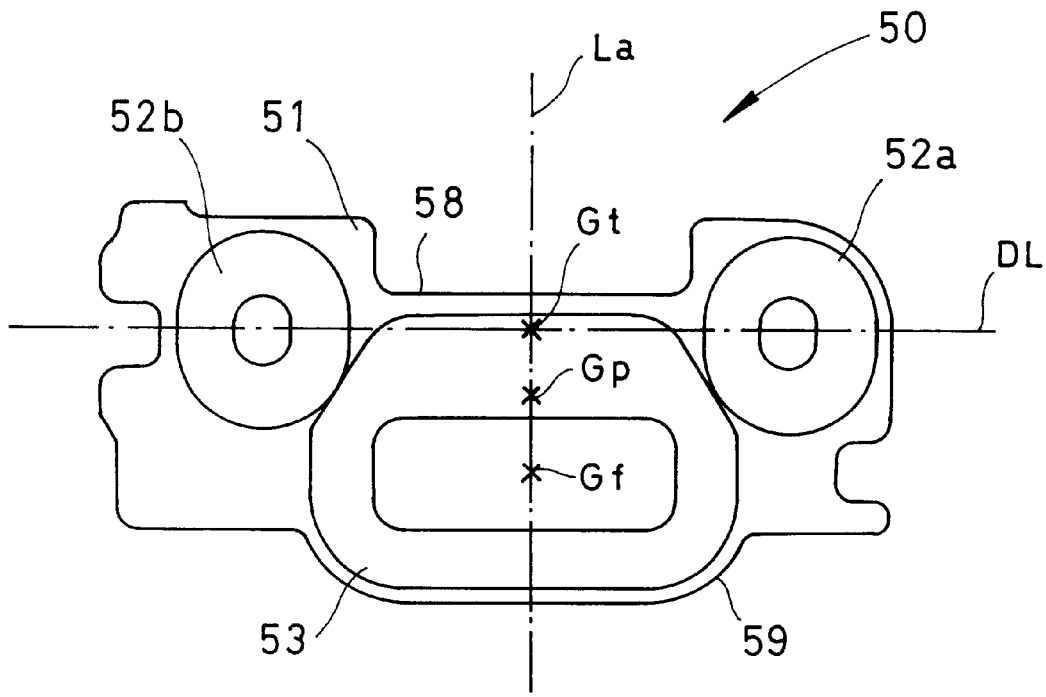
FIG. 24 is a diagram showing the position of a center of gravity of the printed circuit board coils.
Figure 25:
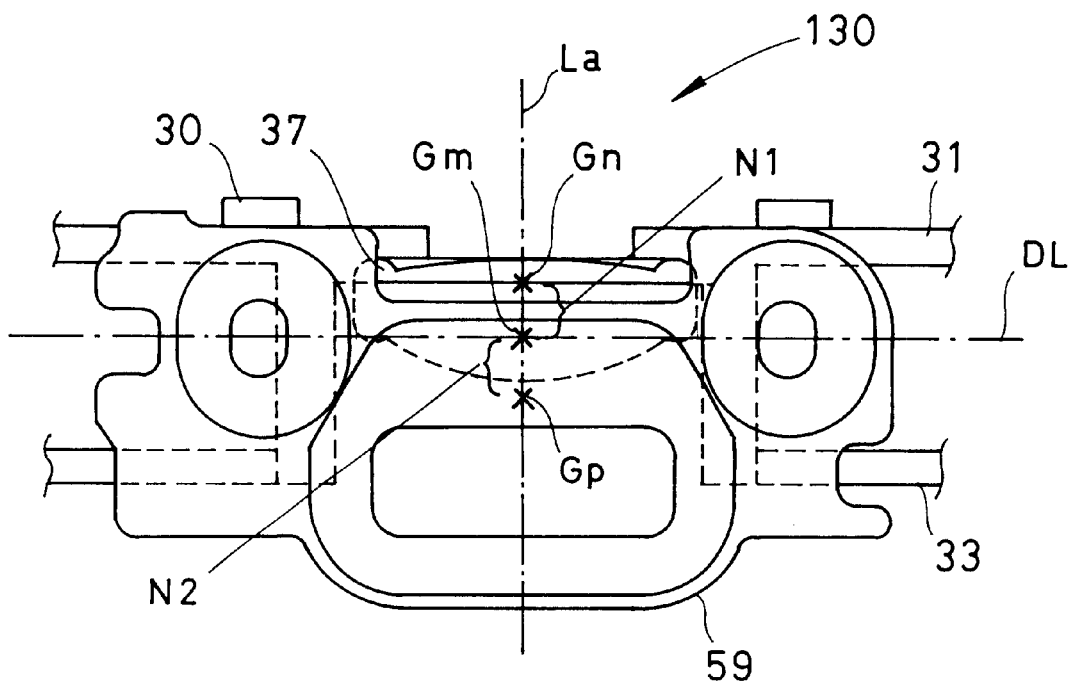
FIG. 25 is a diagram showing the position of a center of gravity of the printed circuit board coils.
Figure 26:
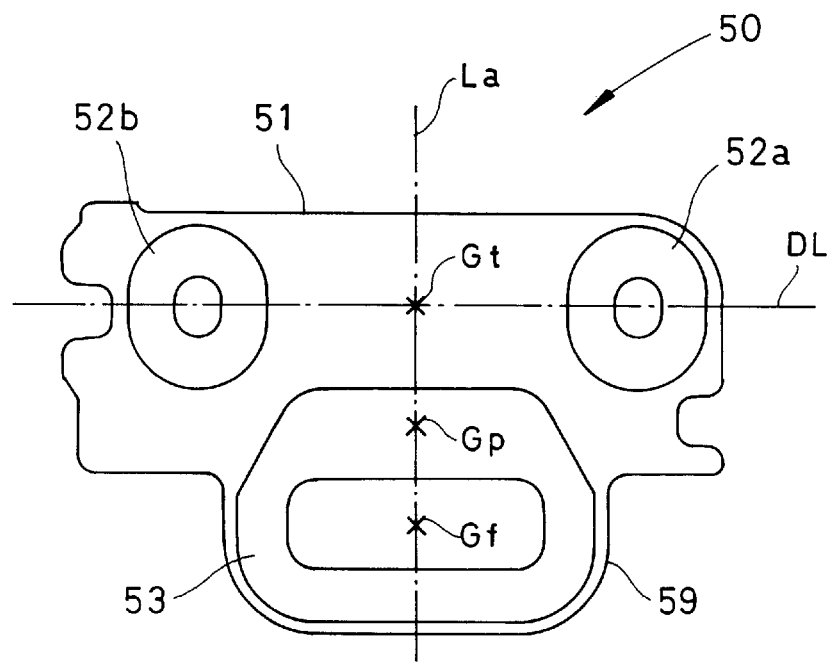
FIG. 26 is a diagram showing another arrangement of the printed circuit board coils.

The center of gravity of the movable portion 130 will now be described with reference to FIGS. 23 to 26. In the movable portion 130, although the printed circuit board A coil 50 and printed circuit board B coil 60 are actually fixed, since the circuit boards 51 and 61 of the printed circuit board A coil 50 and printed circuit board B coil 60 are formed in the same shape, it can be regarded that their weight positions are the same. FIGS. 23 to 26 illustrate only the printed circuit board A coil 50 in order to avoid complication of explanation. FIG. 23 is a diagram showing the center of gravity in the case where the objective lens 37 is built in the lens holder 30. FIG. 24 is a diagram showing the center of gravity of the printed circuit board A coil 50. FIG. 25 is a diagram showing the center of gravity of the movable portion 130. FIG. 26 shows an example in the case where the focusing A coil 53 is provided at a further lower position.

The lens holder 30 is an almost square member having a hollow structure which is resin molded and has the top surface 31, as described above, the center of gravity of the lens holder 30 is at the position of Gb in the diagram that is slightly nearer to the top surface 31 than the center of the lens holder 30 as shown in FIG. 23. When the objective lens 37 is attached to the lens holder 30, the center of gravity of the lens holder 30 is shifted to the position shown at Gn in the diagram, that is further moved toward the top surface 31 side.

As for the printed circuit board A coil 50, as shown in FIG. 24, in the area between the tracking A coil 52a and tracking B coil 52b, the concave notched portion 58 is formed in the upper portion of the circuit board 51 and the convex portion 59 is formed in the bottom portion of the circuit board 51. As for the printed circuit board A coil 50, the tracking A coil 52a and tracking B coil 52b are symmetrically formed on the right and left sides with respect to the projecting line of the optical axis La. The center of gravity of the tracking A coil 52a and tracking B coil 52b, therefore, is at the position shown by Gt in the diagram corresponding to the cross point of the operating line DL of the tracking drive force connecting the center points of the two tracking coils 52a and 52b and the projecting line of the optical axis La. The center of gravity of the focusing A coil 53 is at the position shown by Gf in the diagram which crosses the projecting line of the optical axis La at the center of the focusing A coil 53. The center of gravity of the printed circuit board A coil 50, consequently, is at the position shown at Gp in the diagram which is lower than the center Gt of gravity of the two tracking coils 52a and 52b and is higher than the center Gf of gravity of the focusing A coil 53.

FIG. 25 shows a state where the printed circuit board A coil 50 is fixed to the lens holder 30. When the printed circuit board A coil 50 is fixed to the position where the top surface 31 of the lens holder 30 and the top surface of the circuit board 51 are located on a straight line, the convex portion 59 of the printed circuit board A coil 50 is fixed in a state where it is projected in a portion lower than the bottom surface 33 of the lens holder 30.

In the state where the printed circuit board A coil 50 is fixed to the lens holder 30 holding the objective lens 37, if a distance N1 from the center Gn of gravity of the lens holder 30 holding the objective lens 37 to the operating line DL of the tracking drive force is equal to a distance N2 from the center Gp of gravity of the printed circuit board A coil 50 to the operating line DL of the tracking drive force, a center Gm of gravity of the movable portion 130 is formed on the projecting line of the optical axis La of the objective lens 37 and on the operating line DL of the tracking drive force.

As for the printed circuit board A coil 50, therefore, when the circuit board 51 is designed, by setting a size of notched portion 58 and a size of convex portion 59 so as to equalize the distance N1 from the center Gn of gravity of the lens holder 30 holding the objective lens 37 to line connecting the center points of the tracking coils 52a and 52b, namely, to the operating line DL of the tracking drive force with the distance N2 from the center Gp of gravity of the printed circuit board A coil 50 to the operating line DL, the center of gravity of the movable portion 130 can be set to the cross point of the operating line DL of the tracking drive force and the projecting line of the optical axis La. When the movable portion 130 is driven in the tracking direction, an angular moment is prevented from being generated.

In the embodiment, since the weight of the focusing coil 53 can be used as a counterweight, therefore, the weight of movable portion 130 is not increased as compared with that in a case of using a dedicated counterweight. An adverse influence due to the creation of an angular moment can be avoided.

The notched portion 58 formed in the upper portion of the circuit board 51 makes the center of gravity of the printed circuit board A coil 50 light, and the distance between the operating line DL of the two tracking coils 52a and 52b and the center Gp of gravity of the printed circuit board A coil 50, namely, N2 can be increased. A weight effect as a counterweight, therefore, is further enhanced. That is, by providing the notched portion 58 for the circuit board 51, the weight as a counterweight can be substantially increased without increasing the total weight of the movable portion 130. An allowance for the weight of the objective lens 37, consequently, increases and the general usefulness of the device is improved.

In the printed circuit board A coil 50, the focusing A coil 53 can be constructed so as to be located in the further lower portion as shown in FIG. 26. By constructing it as mentioned above, since the center Gf of gravity of the focusing A coil 53 is located at a position lower than that of the example shown in FIG. 24, the center Gp of gravity of the printed circuit board A coil 50 is also shifted to a lower position. If it is constructed as mentioned above, however, the weight of the circuit board 51 increases to a value larger than that in the example shown in FIG. 24 and the convex portion 59 of the circuit board 51 increases in size, so that the moving range in the downward focusing direction of the movable portion 130 is limited. The shape of the printed circuit board A coil 50 is, therefore, set in accordance with the position of the center of gravity of the lens holder 30 holding the objective lens 37.

Figure 27:
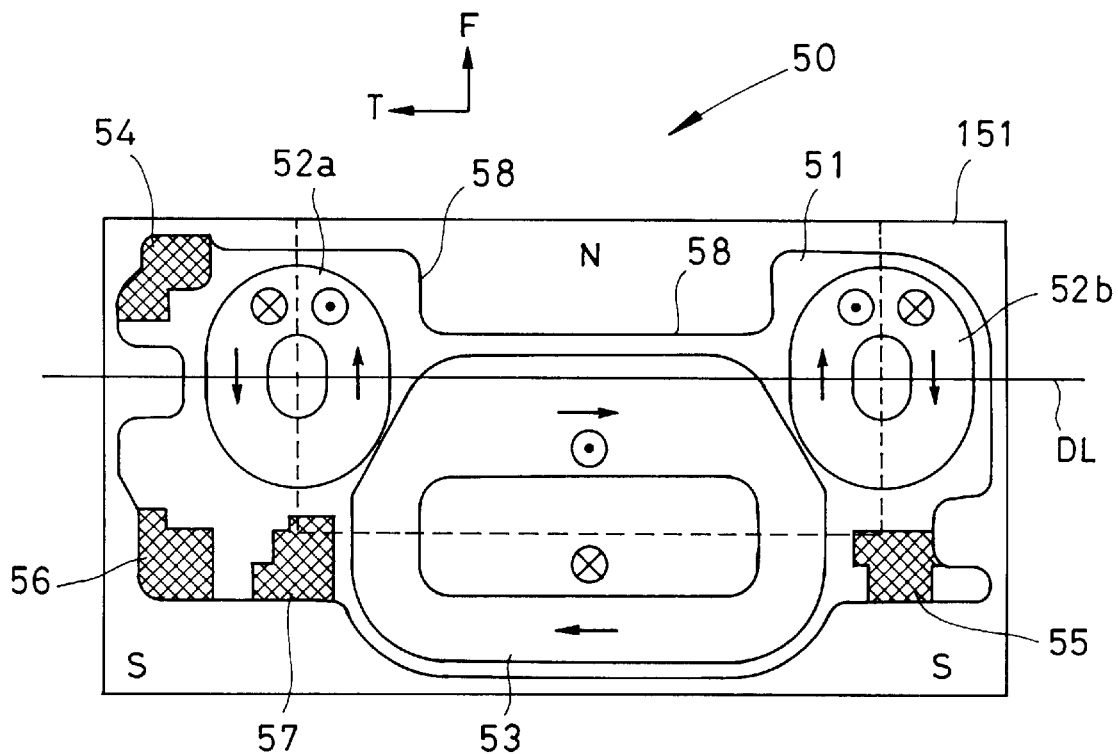
FIG. 27 is a diagram for explaining a focusing drive force and a tracking drive force which are generated by the printed circuit board coils.

The operation of the movable portion of the pickup apparatus 200 according to the invention will now be described with reference to FIG. 27. FIG. 27 is an explanatory diagram showing a relative positional relation of the printed circuit board A coil 50 and magnets 151 in the case where the movable portion 130 is at the home position.

The magnet 151 is a multipole magnetized magnet in which, for example, an N pole is magnetized at the center in an almost square shape and an S pole having an almost U-shape is magnetized so as to surround the N pole from three portions. A magnetization area of the N pole generates a magnetic flux which is perpendicular to the surface of the diagram and directed from the back side to the front side. A magnetization area of the S pole generates a magnetic flux which is perpendicular to the surface of the diagram and directed from the front side to the back side. As shown in FIG. 27, the coils are arranged so that the center of each coil formed on the printed circuit board A coil 50 is located on a boundary line of the N pole and S pole of the magnet 151.

When a tracking drive current is supplied between the tracking A input terminal 54 and tracking A output terminal 55 and a current in the direction shown by arrows in the diagram flows in the area between the tracking A coil 52a and tracking B coil 52b, a tracking drive force to the left shown by the arrow T in the diagram is generated. When a drive current opposite to that mentioned above is supplied, a tracking drive force to the right in the direction opposite to the arrow T in the diagram is generated.

When a focusing drive current is supplied to the focusing A input terminal 56 and focusing A output terminal 57 and a current in the direction shown by arrows in the diagram flows in the focusing A coil 53, an upward focusing drive force shown by an arrow F in the diagram is generated. When a drive current opposite to that mentioned above is supplied, similarly, a downward focusing drive force in the direction opposite to the arrow F in the diagram is generated.

According to the invention, the lens driving apparatus for a disc player which can avoid the rolling movement of the movable portion without increasing the weight of the movable portion of the actuator and the printed circuit board coils for the lens driving apparatus can be provided.

What is claimed is:

1. A lens driving apparatus for an optical disc player having magnetic flux applying means for movably supporting a lens holder on which an objective lens, a focusing coil, and a pair of tracking coils are fixed and for applying a magnetic flux to said focusing coil and said tracking coils, wherein said focusing coil is fixed so that a center of gravity of said focusing coil is located lower in a focusing direction than a plane including a distribution center line of a tracking drive force generated from said tracking coils.

2. An apparatus according to claim 1, wherein said focusing coil and said tracking coils are printed circuit board coils printed on one circuit board.

3. An apparatus according to claim 2, wherein said focusing coil is fixed to said lens holder so that a part of the focusing coil is projected from a lower edge of the lens holder toward a lower side in the focusing direction.

4. An apparatus according to claim 2, wherein said printed circuit board coils are formed by printing a pair of tracking coils arranged in said tracking direction and a focusing coil located lower in the focusing direction than said pair of tracking coils onto said circuit board, and a section of said circuit board in an area between said pair of tracking coils is notched.

5. An apparatus according to claim 2, wherein said circuit board is a flat plate.

6. A lens driving apparatus for a disc player, having a printed circuit board to be fixed to a lens holder and carrying thereon at least a single focusing coil and a pair of tracking coils, wherein said pair of tracking coils are arranged in a tracking direction and printed on said board, said focusing coil is printed on said board so that a center axis of said focusing coil is located at a position different from that on a straight line connecting center axes of said pair of tracking coils, a notched portion of said circuit board provided in an area between said tracking coils, and a position of a center of gravity of said lens driving apparatus is different from that on said straight line.

7. An apparatus according to claim 3, wherein said printed circuit board coils are formed by printing a pair of tracking coils arranged in said tracking direction and a focusing coil located lower in the focusing direction than said pair of tracking coils onto said circuit board, and a section of said circuit board in an area between said pair of tracking coils is notched.

8. An apparatus according to claim 3, wherein said circuit board is a flat plate.

9. An apparatus according to claim 4, wherein said circuit board is a flat plate.

10. An apparatus according to claim 1, wherein said focusing coil is located between the pair of tracking coils in a tracking direction.

11. An apparatus according to claim 6, wherein said focusing coil is located between the pair of tracking coils in the tracking direction.

12. An apparatus according to claim 7, wherein said focusing coil is located between the pair of tracking coils in the tracking direction.

* * * * *